US011297020B2

(12) United States Patent
Lane et al.

(10) Patent No.: US 11,297,020 B2
(45) Date of Patent: Apr. 5, 2022

(54) UNIFIED MESSAGING PLATFORM FOR DISPLAYING ATTACHED CONTENT IN-LINE WITH E-MAIL MESSAGES

(71) Applicant: Microsoft Technology Licensing, LLC, Redmond, WA (US)

(72) Inventors: Mira Lane, Bellevue, WA (US); Michael Brasket, Kirkland, WA (US); Larry Waldman, Seattle, WA (US); Chad Voss, Seattle, WA (US); Ewin Davis Kannuthottiyil, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/147,776

(22) Filed: Jan. 13, 2021

(65) Prior Publication Data
US 2021/0194837 A1    Jun. 24, 2021

Related U.S. Application Data

(63) Continuation of application No. 16/050,897, filed on Jul. 31, 2018, now Pat. No. 10,897,441, which is a
(Continued)

(51) Int. Cl.
*G06F 15/16* (2006.01)
*H04L 51/08* (2022.01)
(Continued)

(52) U.S. Cl.
CPC ............ *H04L 51/08* (2013.01); *G06F 40/117* (2020.01); *G06F 40/169* (2020.01);
(Continued)

(58) Field of Classification Search
CPC ......... H04L 51/08; H04L 51/10; H04L 51/18; H04L 51/22; H04L 51/36; G06F 40/169;
(Continued)

(56) References Cited

U.S. PATENT DOCUMENTS 5,664,208 A    9/1997 Pavley et al.
8,086,960 B1   12/2011 Gopalakrishna et al.
(Continued)

FOREIGN PATENT DOCUMENTS

CN    1365573 A    8/2002
CN    1421012 A    5/2003
(Continued)

OTHER PUBLICATIONS

U.S. Appl. No. 14/800,210 U.S. Pat. No. 10,063,501, filed Jul. 15, 2015, Unified Messaging Platform for Displaying Attached Content In-Line With E-Mail Messages.
(Continued)

*Primary Examiner* — Imad Hussain
(74) *Attorney, Agent, or Firm* — Schwegman Lundberg & Woessner, P.A.

(57) ABSTRACT

Systems and methods are disclosed for providing attachments of data files in online communication sessions between participants. A participant selects a data file and is able to input text and edit the data file within a message input region. The edited data file and text is transmitted to another participant of the communication session. The other participant is able to view the text and an excerpt of the edited data file within a user interface. The other participant can select the edited data file to view the edited data file within the user interface.

20 Claims, 22 Drawing Sheets

Related U.S. Application Data continuation of application No. 14/800,210, filed on Jul. 15, 2015, now Pat. No. 10,063,501.

(60) Provisional application No. 62/165,856, filed on May 22, 2015.

(51) Int. Cl.
| | |
|---|---|
| *H04L 51/56* | (2022.01) |
| *G06Q 10/10* | (2012.01) |
| *H04L 51/18* | (2022.01) |
| *G06F 40/117* | (2020.01) |
| *G06F 40/169* | (2020.01) |
| *H04L 51/10* | (2022.01) |
| *H04L 51/42* | (2022.01) |

(52) U.S. Cl.
CPC ......... *G06Q 10/101* (2013.01); *G06Q 10/103* (2013.01); *H04L 51/10* (2013.01); *H04L 51/18* (2013.01); *H04L 51/22* (2013.01); *H04L 51/36* (2013.01)

(58) Field of Classification Search
CPC ... G06F 40/117; G06Q 10/101; G06Q 10/103
USPC ........................................................ 709/206
See application file for complete search history.

(56) References Cited

U.S. PATENT DOCUMENTS

| | | | |
|---|---|---|---|
| 9,173,003 | B2 | 10/2015 | Ellis et al. |
| 2004/0268246 | A1* | 12/2004 | Leban .................. H04L 51/066 |
| | | | 715/239 |
| 2009/0319618 | A1* | 12/2009 | Affronti ................. H04L 51/16 |
| | | | 709/206 |
| 2010/0271391 | A1 | 10/2010 | Repin et al. |
| 2012/0284639 | A1* | 11/2012 | Yuniardi ............. G06Q 10/107 |
| | | | 715/752 |
| 2015/0347368 | A1* | 12/2015 | Carlen .................... H04L 51/08 |
| | | | 715/230 |

FOREIGN PATENT DOCUMENTS

| | | | |
|---|---|---|---|
| CN | 1525375 | A | 9/2004 |
| CN | 1596026 | A | 3/2005 |
| CN | 1794231 | A | 6/2006 |
| CN | 103503019 | A | 1/2014 |
| JP | 2003162489 | A * | 6/2003 |
| JP | 2007241639 | A | 9/2007 |

OTHER PUBLICATIONS

U.S. Appl. No. 16/050,897 U.S. Pat. No. 10,897,441, filed Jul. 31, 2018, Unified Messaging Platform for Displaying Attached Content In-Line With E-Mail Messages.
U.S. Appl. No. 14/801,067, filed Jul. 16, 2015, Interactive Command Line for Content Creation.
U.S. Appl. No. 14/799,757, filed Jul. 15, 2015, Unified Messaging Platform for Providing Interactive List Objects.
"Notice of Allowance and Search Report issued in Chinese Patent Application No. 201680029633.2", dated Mar. 17, 2021, 8 Pages.
"Office Action Issued in Indian Patent Application No. 201747036940", dated Mar. 21, 2021, 7 Pages.
Poremsky, Diane, "The Blue Line and Inline Replies in HTML Messages", Retrieved From: https://www.slipstick.com/outlook/email/blue-line-html-messages/, Oct. 4, 2014, 4 Pages.
Zhang, Qiao, "Research on News Recommendation in Social Media Based on User Comments", (w/ English Abstract), In Master's Dissertation of Southwestern University of Finance and Economics, Mar. 19, 2014, 67 Pages.
"Discussions—A New Way to Collaborate Online with Office", Retrieved from: https://web.archive.org/web/20010624091717/http://office.microsoft.com/assistance/2000/wWebDiscussions.aspx, Jun. 24, 2001, 2 Pages.
"Web Folders: A New Way to Share Information in Office 2000", Retrieved from: https://web.archive.org/web/20010624092142/http://office.microsoft.com/Assistance/2000/wWebPublish.aspx, Jun. 24, 2001, 1 Page.
"Office Action Issued in European Patent Application No. 16727059.4", dated Jun. 16, 2021, 19 Pages.
Brush, Alicej., "Annotating Digital Documents for Asynchronous Collaboration", In Technical Report Feb. 9, 2002, Sep. 2002, 119 Pages.
Brush, et al., "Notification for Shared Annotation of Digital Documents", In Proceedings of the SIGCHI Conference on Human Factors in Computing Systems, Apr. 20, 2002, pp. 89-96.
Brush, et al., "Robust Annotation Positioning in Digital Documents", In Proceedings of the SIGCHI Conference on Human Factors in Computing Systems, Mar. 31, 2001, pp. 285-292.
Zipper, et al., "Acrobat-Based Collaboration: How Well Does It Work?", In Seybold Report Analyzing Publishing Technologies, vol. 1, No. 11, Sep. 3, 2001, 7 Pages.
"Second Office Action and Search Report Issued in Chinese Patent Application No. 201680029632.8", dated Jan. 4, 2021, (w/ Concise Statement of Relevance), 10 Pages.
"Second Office Action Issued in Chinese Patent Application No. 201680029633.2", dated Nov. 5, 2020, (w/ English Translation), 16 Pages.
Brust, et al., "On Anomalies in Annotation Systems", In Proceedings of the Third Advanced international Conference on Telecommunications, May 2007, 7 Pages.
D., Thomas, "Mail composition: opening/editing attached file sometimes unexpectedly opens/edits original file (only if attachment was added via TB or drag-and-drop (non-MAPI) and draft has never been closed yet): MAPI and non-MAPI behaviour should be Consistent", Retrieved From https://bugzilla.mozilla.org/show_bug.cgi?id=378046, Jul. 19, 2011, 35 Pages.
"Summons to Attend Oral Proceedings Issued In European Patent Application No. 16727059.4", Mailed Date: Jan. 11, 2021, 15 Pages.
Nagao et al., "Semantic Annotation and Transcoding: Making Web Content More Accessible", In Journal of IEEE MultiMedia, vol. 8, Issue 2, Apr. 2001, pp. 69-81.
Suderman, et al., "Layering and Merging Linguistic Annotations", In Proceedings of the 5th Workshop on NLP and XML (NLPXML-2006): Multi-Dimensional Markup in Natural Language Processing, Jan. 2006, pp. 89-92.
Zhimao, et al., "Discussion on the PDF Document Annotation Method", (w/ English Abstract), In Proceedings of Journal of Yunnan University (Natural Science Edition), vol. 33, No. S2, Dec. 15, 2011, pp. 107-110.
"Notice of Allowance issued in Chinese Patent Application No. 201680029632.8", (w/ English Translation), dated Apr. 29, 2021, 9 Pages.
"Communicating Presentation Information in Internet Messages: The Content-Disposition Header FileId", RFC 2183, Networking Group, (Aug. 1997), 12 pgs.

* cited by examiner

FIG. 2D

COMMUNICATION PLATFORM

DESIGN TEAM
ADVENTURE WORKS
General 2
New Product Launch 7
Launch Readiness
Engineering
Finance
Random
+7 More

LEADERSHIP TEAM
EMAIL — 252b
• Rob, Sofia — 252a
• Rachel 10
• Rob, Jim, Rachel, Sophia 2 — 252c
• Jeffrey 2
• Robert, Eric 2
• Others 12

PEOPLE FILES LISTS LINKS TAGS — 202

SEARCH
ROB, JIM, RACHEL, SOPHIA — 252c
CONVERSATIONS  FILES  LINKS  LISTS + — 258
  258a    258b   258c  258d

ROB HALL — Hey folks - please make sure you're testing the new site on iя8 and ie9.  2 hrs ago

ME — Got it. I'm doing some testing now. @rachel, can you give...  2 hrs ago

RACHEL MORRISON — Looks like most of us agree that this is a step in the right direction.  2 hrs ago
— 254a

LT WORKSTREAMS — 260

| WORKSTREAM | OWNER | STATUS | | | + |
|---|---|---|---|---|---|
| Improving ar clickthrough | Rob meyer | ○ | ● | | |
| Boosting homepage impressions | Paul ray | ○ | ● | | |
| Fixing brazil dip | Bhrigu sareen | ○ | ● | | |
| Homepage search ctr | Manisha power | ○ | ● | | 1 |
| Downlevel browser impressions | Steve chang | ○ | ● | | |
| Samsung tv inventory leaking | Josh smith | ○ | ● | | 6 |

ROB HALL — WELL DONE FOLKS PLEASE LET ME KNOW IF ANY ISSUES COME U...  2 HRS AGO

NEW MESSAGE

— 204

256a 256b
PING LI

⚐ 7  📅 1

GROUP AVAILABILITY 282
Today      9-10am
Tomorrow   9-10am   22:30pm
           9-10AM   22:30pm  22:30pm  More

COMMON MEETINGS 284
TODAY      22:30pm
All Hands
TOMORROW   22:30pm
Dev demo Blitz

PEOPLE
MIKE LANE
Project Manager
RACHEL MORRISON
Senior Project Manager
SOPHIA BOWMAN
Corp Vp
PING LI
Program Manager

UNIFIED MESSAGING PLATFORM FOR DISPLAYING ATTACHED CONTENT IN-LINE WITH E-MAIL MESSAGES

CROSS-REFERENCE TO RELATED APPLICATIONS

This application is a continuation of and claims priority to U.S. patent application Ser. No. 16/050,897, filed Jul. 31, 2018, and entitled "UNIFIED MESSAGING PLATFORM FOR DISPLAYING ATTACHED CONTENT IN-LINE WITH E-MAIL MESSAGES," which claims priority to U.S. patent application Ser. No. 14/800,210, filed Jul. 15, 2015, and entitled "UNIFIED MESSAGING PLATFORM FOR DISPLAYING ATTACHED CONTENT IN-LINE WITH E-MAIL MESSAGES," now issued as U.S. Pat. No. 10,063,501, issued on Aug. 28, 2018, which claims priority to U.S. Provisional Application Ser. No. 62/165,856, entitled "SYSTEM AND METHODS FOR IMPLEMENTING UNIFIED MESSAGING PLATFORM." filed on May 22, 2015, the contents of these prior applications are considered part of this application, and are hereby incorporated by reference in their entirety.

BACKGROUND

Numerous and diverse communications platforms are currently available. Some communications platforms, e.g., messaging and/or email platforms, allow for a certain amount of interoperability. However, these platforms fail to adequately address the needs and requirements of contemporary team environments. For example, traditional email applications are configured such that each message is addressed to one or more recipients by the sender. It is often difficult for the sender to know which recipients would be interested in receiving certain information, which leads to message forwarding and/or overlooking relevant or key individuals. In the case of message forwarding, the communication chain becomes fractured, which results in disparate information being provided to various members of a team. Moreover, when certain members are overlooked and/or excluded, information that would be useful to the whole team is archived and acted on by only a subset of the team. The above deficiencies are compounded by the fact that email messaging is overused for too many purposes—e.g., from messages as basic as requesting approval from the recipient to messages attaching critical vision documents for an organization—which leads to overloaded inboxes and overwhelmed recipients.

Other communication tools and mediums have been developed to fill the gaps, such as instant messaging, short message service (SMS), Yammer, Skype. SharePoint, etc., but these tools add complexity rather than an overarching solution. For instance, while these additional communications tools are useful in point solutions, they also create the need for users to visit multiple locations to obtain a complete picture of related information, tasks and obligations.

It is with respect to these and other general considerations that embodiments have been described. Also, although relatively specific problems have been discussed, it should be understood that the embodiments should not be limited to solving the specific problems identified in the background.

SUMMARY

In a first example, a method for providing attachments of data files in online communication sessions between a plurality of participants includes: causing display of a first user interface at a first client device of a first participant of a communication session, the first user interface comprising a message input field defined within the first user interface for receiving input to compose messages for transmission in the communication session; causing display of a second user interface at the second client device of a second participant of the communication session, the second user interface comprising a region defined for displaying messages within the second user interface previously transmitted by participants of the communication session; receiving selection of a data file at the first client device; causing display of at least a first excerpt of the data file editable within the message input field of the first user interface; receiving an edit to the data file through the message input field of the first user interface; incorporating the edit to the data file at a stored location of the data file; receiving textual input through the message input field of the first user interface causing display of text within the message input field; transmitting the edited data file and the text to the second client device; and causing display of the text and a second excerpt of the edited data file within the region defined for displaying messages of the second user interface; receiving selection of the second excerpt within the region; and causing display of the edited data file within the region in response to receiving the selection of the second excerpt.

In another example, a system for providing attachments of data files in online communication sessions between a plurality of participants includes: one or more hardware processors; one or more memories, storing instructions, which when executed, cause the one or more hardware processors to perform operations comprising: causing display of a first user interface at a first client device of a first participant of a communication session, the first user interface comprising a message input field defined within the first user interface for receiving input to compose messages for transmission in the communication session; causing display of a second user interface at the second client device of a second participant of the communication session, the second user interface comprising a region defined for displaying messages within the second user interface previously transmitted by participants of the communication session; receiving selection of a data file at the first client device; causing display of at least a first excerpt of the data file editable within the message input field of the first user interface; receiving an edit to the data file through the message input field of the first user interface; incorporating the edit to the data file at a stored location of the data file; receiving textual input through the message input field of the first user interface causing display of text within the message input field; transmitting the edited data file and the text to the second client device; and causing display of the text and a second excerpt of the edited data file within the region defined for displaying messages of the second user interface; receiving selection of the second excerpt within the region; and causing display of the edited data file within the region in response to receiving the selection of the second excerpt.

In another example, a system for providing attachments of data files in online communication sessions between a plurality of participants includes: means for causing display of a first user interface at a first client device of a first participant of a communication session, the first user interface comprising a message input field defined within the first user interface for receiving input to compose messages for transmission in the communication session; means for causing display of a second user interface at the second client device of a second participant of the communication session, the second user interface comprising a region defined for displaying messages within the second user interface previously transmitted by participants of the communication session; means for receiving selection of a data file at the first client device; means for causing display of at least a first excerpt of the data file editable within the message input field of the first user interface; means for receiving an edit to the data file through the message input field of the first user interface; means for incorporating the edit to the data file at a stored location of the data file; means for receiving textual input through the message input field of the first user interface causing display of text within the message input field; means for transmitting the edited data file and the text to the second client device; and means for causing display of the text and a second excerpt of the edited data file within the region defined for displaying messages of the second user interface; means for receiving selection of the second excerpt within the region; and means for causing display of the edited data file within the region in response to receiving the selection of the second excerpt.

In some aspects of the system, the operations also include receiving input selecting the extracted first portion of content, and opening the attached file to a location corresponding to the selection based on the structural information. In some aspects of the system, the synchronizing of the edited first portion of content comprises synchronizing the edited first portion of content in the attachment to a plurality of users. In some aspects of the system, the synchronization includes generating computer readable instructions readable by a unified messaging application, the instructions comprising an indication of the edited first portion and one or more identifiers mapping the edited first portion to a level or position within a file structure, wherein the computer readable instructions are configured to apply the edit to the first portion within the file structure.

Another aspect disclosed is a method including receiving a message comprising a message body and an attachment, the attachment including a first portion and a second portion of content, extracting the first portion of content from the attachment, displaying the extracted first portion in the message body of the message, receiving, within the message body, an edit to the extracted first portion displayed in the message body, and synchronizing the edited first portion with the first portion of content in the attachment.

Some aspects of the method include operations such as generating structural information for the message body and the attachment, the structure information including indexing that associates the extracted first portion of content to one or more locations in the attachment, wherein the synchronizing of the edited first portion of content is based on the structure information. In some aspects, the method includes operations of generating the structural information to include anchor information, the anchor information including position information including one or more of line information, page information, paragraph information, sentence information of the attachment, wherein the synchronizing is further based on the anchor information. Some aspects of the method include operations of associating the extracted first portion of content with one or more identifiers specifying a level or position of the extracted first portion of content within a structure of the attachment, wherein the synchronizing is further based on the one or more identifiers.

In some aspects, the method includes determining whether the first portion includes annotations. The annotations include edits to content of the first portion or comments appended within the first portion, wherein the generation of the structural information to include anchor information is in response to the determination.

In some aspects of the method, the operations include receiving input selecting the extracted first portion of content, and opening the attached file to a location corresponding to the selection based on the structural information. In some aspects, the synchronizing of the edited first portion of content comprises synchronizing the edited first portion of content in the attachment to a plurality of users. In some aspects, the synchronization includes generating computer readable instructions readable by a unified messaging application, the instructions comprising an indication of the edited first portion and one or more identifiers mapping the edited first portion to a level or position within a file structure, wherein the computer readable instructions are configured to apply the edit to the first portion within the file structure.

Another aspect disclosed is a non-transitory computer readable storage medium comprising instructions that when executed configured hardware processing circuitry to perform operations comprising receiving a message comprising a message body and an attachment, the attachment including a first portion and a second portion of content, extracting the first portion of content from the attachment, displaying the extracted first portion in the message body of the message, receiving, within the message body, an edit to the extracted first portion displayed in the message body; and synchronizing the edited first portion with the first portion of content in the attachment.

In some aspects, the operations also include generating structural information for the message body and the attachment, the structure information including indexing that associates the extracted first portion of content to one or more locations in the attachment, wherein the synchronizing of the edited first portion of content is based on the structure information. In some aspects, the operations also include generating the structural information to include anchor information, the anchor information including position information including one or more of line information, page information, paragraph information, sentence information of the attachment, wherein the synchronizing is further based on the anchor information. In some aspects, the operations include associating the extracted first portion of content with one or more identifiers specifying a level or position of the extracted first portion of content within a structure of the attachment, wherein the synchronizing is further based on the one or more identifiers.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 2D illustrates an exemplary interface for interacting with the unified messaging platform, according to a fourth example embodiment.

FIG. 2E illustrates an exemplary interface for interacting with the unified messaging platform, according to a fifth example embodiment.

FIG. 9A illustrates an exemplary interface for displaying a content embedded message, according to an example embodiment.

FIG. 9B illustrates an exemplary interface for displaying an associated file in response to selection of embedded content, according to an example embodiment.

FIG. 10 illustrates an exemplary interface for embedding extracted content in a message, according to an example embodiment.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In particular, a unified messaging platform is described which provides a comprehensive environment for collaboration, file sharing, and project management. In aspects, the unified messaging platform is organized based on one or more teams or projects, with each team or project further organized by customizable categories, such as finance, engineering, launch readiness, debugging, catering, construction, general, random, and the like. A user interface is provided for ready access to information related to each category (e.g., communications, files, tasks, work product, etc.), which information is organized by pages or tabs for each category. Moreover, documents, project updates, tasks, and communications between team members are automatically and seamlessly synchronized across the platform such that each team member remains abreast of the current progress and status of a project. For instance, collaboration regarding an attached file is facilitated by extracting and providing at least a portion of the attached file within a message body. In aspects, annotations within the attached file may be extracted and summarized for display within the message body. Moreover, revisions made to extracted content within the message body may be automatically synchronized and reflected in the attached file, as well as in a files tab storing files associated with a team. It is with respect to these and other general considerations that embodiments have been made.

Figure 1:
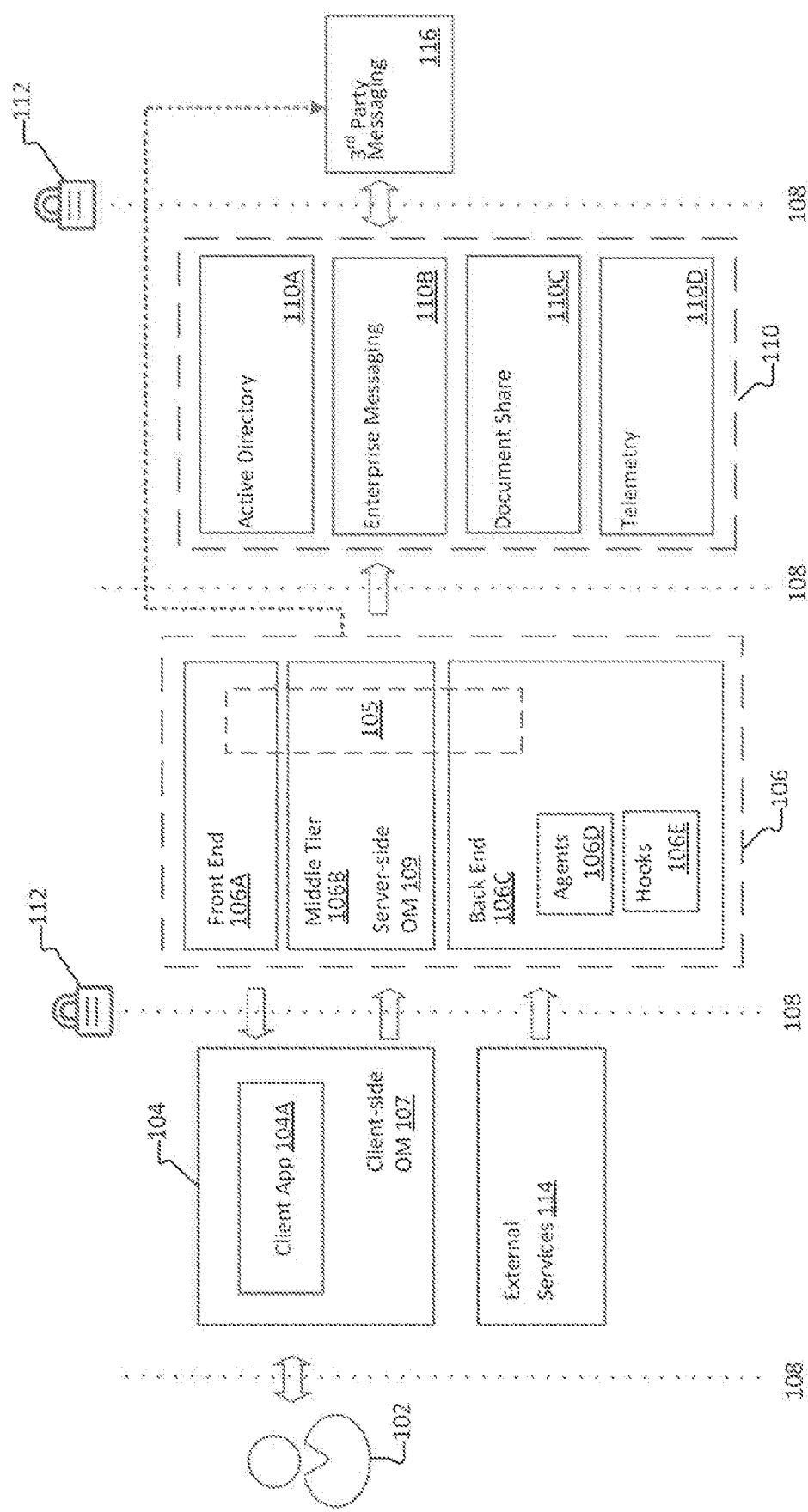
FIG. 1 illustrates an exemplary conceptual model for a unified messaging platform, according to an example embodiment.

FIG. 1 illustrates an exemplary system for providing a unified messaging platform, according to an example embodiment.

In aspects, a unified messaging platform (UMP) 105 may be implemented via a client unified messaging application 104a executed on client computing device 104 in communication with a server unified messaging application executed on a server computing device 106. In some aspects, the client computing device 104 may comprise a client-side object model 107 in communication with a server-side object model 109 (e.g., implemented by middle tier 106b). In a basic configuration, the client computing device 104 is a personal or handheld computer having both input elements and output elements. For example, the client computing device 104 may be one of: a mobile telephone; a smart phone; a tablet; a phablet; a smart watch; a wearable computer; a personal computer; a desktop computer; a laptop computer; a gaming device/computer (e.g., Xbox); a television; and the like. This list is exemplary only and should not be considered as limiting. Any suitable client computing device for executing a messaging application may be utilized.

The unified messaging platform 105 is a communication system/service that provides a collaborative environment for users to communicate and collaborate. The unified messaging platform 105 is shown by a dashed line, illustrating that implementation of the unified messaging platform 105 may involve the front end 106a, middle tier 106b and/or the back end 106c of server computing device 106, among other examples. In aspects, server computing device 106 may include one or more server computing devices 106. In an example the unified messaging platform 105 presents a configurable and extensible workspace for collaboration between users through a user interface (UI) that may comprise a plurality of different views. Users of the unified messaging platform 105 may be include but are not limited to: one or more persons, companies, organizations, departments, virtual teams, ad-hoc groups, vendors, customers, third-parties, etc. Users of the unified messaging platform 105 may have one or more user profiles that are customizable by the user. The unified messaging platform 105 enables visibility and communication between users including users who are organized in teams or groups as well as users/groups outside of a team/group. Policies may be set for teams/groups by one or more administrators of a team/group and by administrators of the unified messaging platform 105. Examples described throughout the present disclosure are designed to accommodate to protect user privacy. Protection of sensitive information, including legally protected data and personally identifiable information, is a paramount consideration for implementing examples described herein. For instance, users may set privacy settings for what data that can displayed/shared, and examples described herein comply with such settings as well as laws related to distribution of data and protection of privacy.

As illustrated in FIG. 1, systems and/or services associated with the unified messaging platform 105 may be implemented as a front end 106a, a middle tier 106b, and a back end 106c on a server computing device 106. However, one skilled in the art will recognize that the unified messaging platform 105 may be implemented across one or more components of system examples described herein, including one or more client computing devices 104 and/or enterprise stack 110. In some aspects, the front end 106a of server computing device 106 may send information and commands via the client unified messaging application 104a to the client computing device 104. For instance, the middle tier 106b and/or the back end 106c of the server computing device 106 may receive information and commands from the client computing device 104 via the client unified messaging application 104a. In other aspects, the front end 106a may act as an intermediary between the client computing device 104 and the middle tier 106b. That is, front end 106a may exchange commands and information with the client computing device 104 and may also exchange the commands and information with middle tier 106b. In an example, the unified messaging platform 105 includes a server unified messaging application executing on server computing device 106 via front end 106a, middle tier 106b, and a back end 106c in communication with the client unified messaging application 104a.

In some aspects, the back end 106c may further comprise or be in communication with one or more application agents 106d to facilitate interoperability and communication with one or more external services 114. More specifically, application agents 106d may interface with external services 114 using web hooks 106e in order to facilitate integration between the unified messaging platform 105 and external services 114. External services 114 are services and/or websites that are hosted or controlled by third parties. For example, external services 114 may include line-of-business (LOB) management services, customer relationship management (CRM) services, debugging services, accounting services, payroll services, etc. External services 114 may further include other websites and/or applications hosted by third parties, such as social media or networking websites; photo sharing websites; video and music streaming websites; search engine websites; sports, news or entertainment websites, and the like. That is, some external services 114 may provide robust reporting, analytics, data compilation and/or storage service, etc., whereas other external services 114 may provide search engines or other access to data and information, images, videos, and the like.

In aspects, data or information may be shared between server computing device 106 and the one or more external services 114. For example, business contacts, sales, etc., may be input via a client computing device 104 in communication with server computing device 106, which is in communication with CRM software hosted by a third party. The third-party CRM software may track sales activity, marketing, customer interactions, etc., to provide analytics or other information for promoting business relations. Alternatively, a manufacturing work order may be input via a client computing device 104 in communication with server computing device 106, which is in communication with LOB management software hosted by a third party. The LOB management software may guide and track the work order by creating work flows such as tasks or alerts for scheduling manufacturing equipment, ordering raw materials, scheduling shipping, relieving inventory, etc. In some cases, the LOB management software may create requests for user approval or review at different stages of a work flow. In still further aspects, a user may issue a query to one or more of the external services 114, such as a request for business contacts, sales for the prior month, the status of a work order, or a search query or request for an image, etc.

As illustrated by FIG. 1, the server computing device 106 may communicate with external services 114 and client computing device 104 via a network 108. In one aspect, the network 108 is a distributed computing network, such as the Internet. In aspects, the unified messaging platform 105 may be implemented on more than one server computing device 106, such as a plurality of server computing devices 106. As discussed above, the server computing device 106 may provide data to and from the client computing device 104 through the network 108. The data may be communicated over any network suitable to transmit data. In some aspects, the network 108 is a computer network such as an enterprise intranet and/or the Internet. In this regard, the network 108 may include a Local Area Network (LAN), a Wide Area Network (WAN), the Internet, wireless and wired transmission mediums. In further aspects, server computing device 106 may communicate with some components of the system via a local network (e.g., an enterprise intranet), whereas server computing device 106 may communicate with other components of the system via a wide area network (e.g., the Internet).

According to further aspects, communication between the unified messaging platform 105 and other components of the system may require authentication 112. Authentication 112 refers to a process by which a device, application, component, user, etc., provides proof that it is "authentic" or that it is "authorized" to access or communicate with another device, application, component, user, etc. Authentication may involve the use of third-party digital certificates, authentication tokens, passwords, symmetric or asymmetric key encryption schemes, shared secrets, authentication protocols, or any other suitable authentication system or method either now known or developed in the future. In aspects, in response to authentication, access or communication may be allowed and data or information may be exchanged between the unified messaging platform 105 and various other components of the system. In some aspects, an environment or network linking various devices, applications, components, users, etc., may be referred to as a "trusted" environment. In a trusted environment, authentication between devices, applications, components, users, etc., may not be necessary.

The unified messaging platform 105 executing operations on the server computing device 106 may further be in communication with one or more enterprise applications (e.g., enterprise stack 110). Enterprise stack 110 may include, for example, an active directory 110a, an enterprise messaging application 110b, a file sharing application 110c, a telemetry application 110d, and the like. The enterprise stack 110 may be stored and/or executed locally, e.g., within an enterprise intranet, or in distributed locations over the Internet. In some cases, enterprise stack 110 may be included within server computing device 106. For example, active directory 110a may be included as part of back end 106c of server computing device 106. In some instances, enterprise stack 110 may reside or communicate with the unified messaging platform 105 within a trusted environment. In aspects, information and/or messages received, sent or stored via the unified messaging platform 105 may be communicated to the enterprise stack 110. Moreover, information and/or messages received, sent or stored via the enterprise stack 110 may be communicated to the unified messaging platform 105.

Additionally, in some aspects, the unified messaging platform 105 executing on the server computing device 106 may be in communication with one or more third party messaging applications 116. Third party messaging applications 116 are messaging applications that are hosted or controlled by third parties, including third party email messaging applications, SMS applications, instant messaging applications, social networking applications, and the like. In aspects, some users who are members of a team may be registered with the unified messaging platform 105 (e.g., internal users), whereas other users who are members of the team may not be registered with the unified messaging platform 105 (e.g., external users) but may be registered with one or more third party messaging applications 116. In some aspects, users who are registered with an enterprise messaging application 110b, but not with the unified messaging platform 105, are considered external users. In this case, the unified messaging platform 105 may communicate with one or more third party messaging applications 116 and/or with one or more enterprise messaging applications 110b to exchange information and messages with external users. In some aspects, communication between the unified messaging platform 105 and the one or more third party messaging applications 116 and/or the one or more enterprise messaging applications 110b over network 108 may involve authentication 112. In other aspects, communication between the unified messaging platform 105 and, for example, the one or more enterprise messaging applications 110b, may not involve authentication 112.

As should be appreciated, the various devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

Figure 2A:
FIG. 2A illustrates an exemplary interface for interacting with the unified messaging platform, according to an example embodiment.

FIG. 2A illustrates an exemplary interface for interacting with the unified messaging platform, according to a first example embodiment.

In aspects, a user may interact with a unified messaging platform via a user interface 200, e.g., a graphical user interface. An exemplary unified messaging platform 105 is provided in the description of FIG. 1, and further described throughout the rest of the present disclosure such as in FIGS. 2A-2G, among other examples. In some aspects, the user interface 200 may involve one or more panes or windows for organizing the display of information and/or interactive controls. In one example, the user interface 200 may include three panes, e.g., a left rail 202, a center pane 204, and a right rail 206. In another example, the user interface 200 may include two panes, e.g., a left rail and a right rail. In still other examples, the user interface 200 may include one pane, four or more panes, and/or panes may be embodied in multiple browser or application windows.

As detailed above, each pane or window may display information in the form of text, graphics, etc., and/or one or more interactive controls or links. For example, a first pane, e.g., left rail 202, may display one or more teams 208, an email portal, etc. As used herein, a team refers to any group of two or more users formed for one or more purposes. A team may be formed for any conceivable purpose or purposes, e.g., a business purpose, a social purpose, a charitable purpose, and the like. Moreover, a team may comprise any type of user, e.g., coworkers, family members, classmates, business associates, and the like. In aspects, a team may be formed within the unified messaging platform 105 by creating a team title, e.g., leadership team, design team, event team, project team, etc., and adding users (e.g., members) to the team. For example, in a settings or administration pane (not shown), members may be added to the team by selecting an identifier of a user, e.g., a user icon, a user email, a user phone number, etc. In at least some aspects, each member of a team is granted access to a team portal or channel. Furthermore, any number of teams may be created within the unified messaging platform 105 and/or teams may be implicitly created based on communications between two or more users.

A team portal may provide access to all communications, files, links, lists, hashtags, development tools, etc., shared by any member of a team. According to embodiments, in response to selection (e.g., by clicking) of a team 208 within a pane, e.g., the left rail 202, a team portal may be opened. A team portal refers to an access point through which team members can view and interact with shared information and other team members. In at least some cases, each member of a team is granted full access to the information and conversations shared within the team portal. In aspects, in response to selection of a team 208, general information regarding the team, project specifications, etc., may be displayed in a second pane, e.g., center pane 204. For example, member names, member contact information (e.g., email addresses, phone numbers, etc.), member usage time, project specifications, project time lines, project mission, and the like, may be displayed in the center pane 204.

A team portal may be further organized based on customizable categories 210 of information for a team 208. For example, any suitable category 210 for organizing team information may be created for a team portal, e.g., finance, engineering, launch readiness, debugging, catering, construction, general, random, and the like. In aspects, information related to a category 210 may be displayed in center pane 204 in response to selecting a category 210 of a team 208 within left rail 202. In some instances, each member of a team is granted full access to information associated with each category 210 of a team 208 within the team portal.

As noted above, a team portal may provide access to all communications, files, links, lists, hashtags, etc., shared by members of a team 208. In aspects, within each category 210, information may further be organized by tabs or pages. For example, each tab 212 may display a different type of information associated with a category 210 in the center pane 204. When selected, a tab 212 may be identified by highlighting, with a different font or font color, by outlining, underlining, etc. As illustrated by FIG. 2A, in response to selection of a first tab (e.g., conversations tab 212a, denoted by underlining) communications 218 between team members may be displayed in center pane 204. As used herein, the term "communication" may be used interchangeably with the term "message." In aspects, a conversation 216 entails two or more communications 218 of any type or mode between team members. In some cases, a conversation 216 may be displayed in ascending order with the most recent communication 218 displayed at the bottom of the center pane 204. Alternatively, a conversation 216 may be displayed in descending order with the most recent communication 218 displayed at the top of the center pane 204.

In some cases, described further below, one or more communications 218 (e.g., communications 218a and 218b) may be grouped as a conversation thread 220. A communication 218 refers to a single message transmitted by a team member in any format (e.g., email, SMS, instant message, etc.) via any mode (e.g., via the unified messaging platform, or via any enterprise or third-party messaging application). That is, messages may be generated within the unified messaging platform between internal users or messages may be communicated to and from external users via enterprise messaging applications (e.g., enterprise messaging application 110b) and/or third party messaging applications (e.g., third party messaging applications 116).

As provided above, each pane or window may display information and/or interactive controls. For example, a third pane, i.e., right rail 206, may display context information, status information, recent activity, and the like. In some aspects, information displayed in the right rail 206 may be related to or associated with the category 210 selected in the left rail 202 and/or the tab 212 selected in the center pane. For instance, where the center pane 204 displays communications, files, links, lists, hashtags, etc., related to a category 210a entitled "New Product Launch," the right rail 206 may display one or more recent files 222, recent links 224, tags 226, or active people 228 related to the New Product Launch. In some aspects, at least some of the information displayed in the right rail 206 may be specific to a particular user (e.g., the particular user accessing the team portal via a client computing device 104, "accessing user"). For example, the particular user accessing the team portal may be identified by a name, icon, or the like, within right rail 206, such as user name 230a or user icon 230b. That is, in some cases, the recent files 222 and/or recent links 224 related to the New Product Launch may have been recently accessed or uploaded by the accessing user. Moreover, the right rail 206 displayed for another user accessing the same category 210 may display a different set of recent files 222 or recent links 224. In further examples, additional or different information relevant to a category 210 and a particular user may be displayed in the right rail 206, e.g., user tasks, user alerts, user calendar, user notes, etc.

According to additional aspects, center pane 204 may include a search field 240. For example, search field 240 may allow a user to search within a team portal for any communication, file, link, list, hashtag, term, team member, calendar, task, event, and the like, related to a team 208. In aspects, search field 240 may allow for plain language searching, Boolean searching (e.g., searching using Boolean operators), or otherwise. In response to entering one or more search terms into the search field 240, any information related to the search terms within the team portal may be displayed as search results to the accessing user.

As should be appreciated, the various features and functionalities of user interface 200 described with respect to FIG. 2A are not intended to limit associated systems and methods to the particular features and functionalities described. Accordingly, additional features and functionalities may be associated with the systems and methods described herein and/or some features and functionalities described may be excluded without departing from the systems and methods described herein.

Figure 2B:
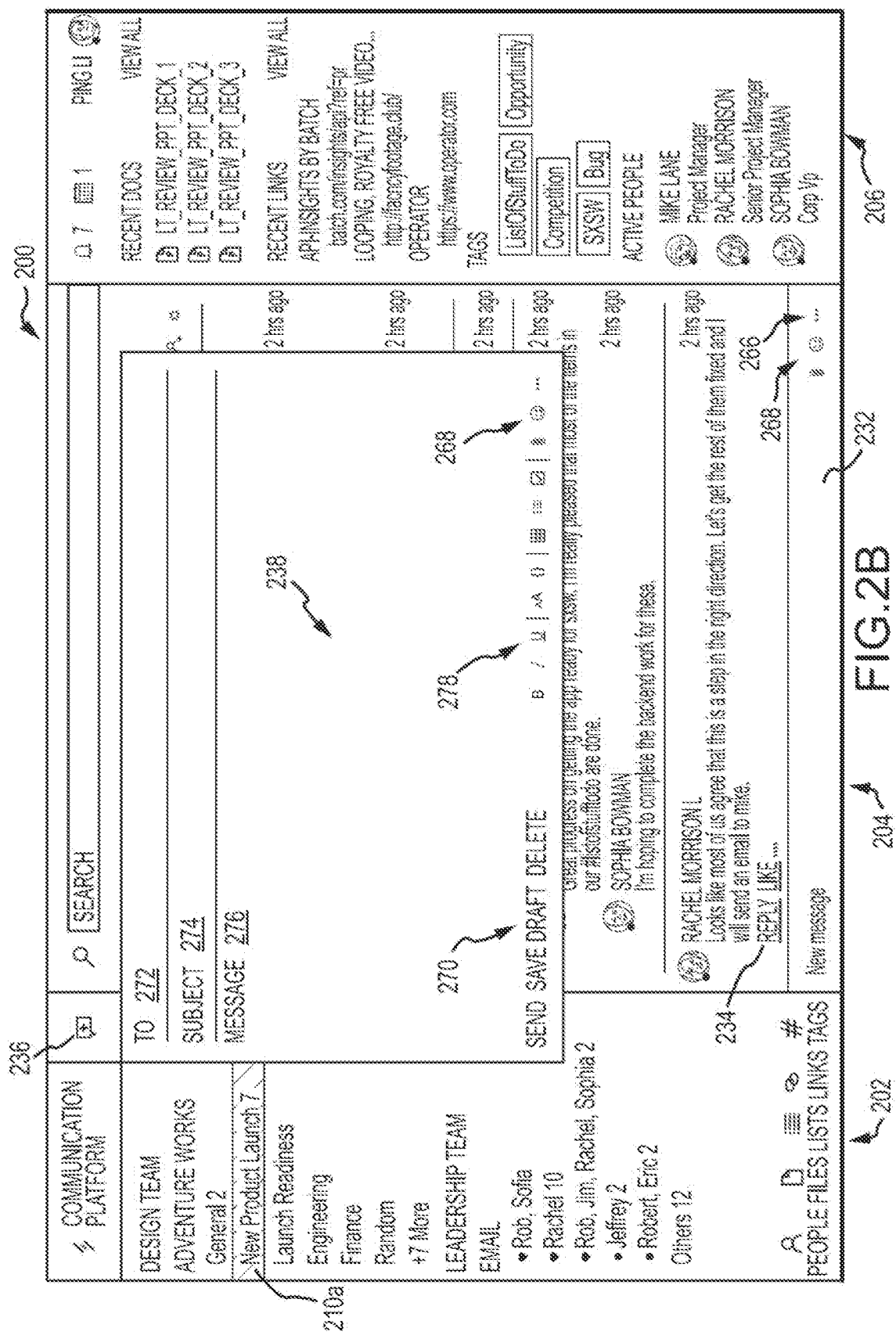
FIG. 2B illustrates an exemplary interface for interacting with the unified messaging platform, according to a second example embodiment.

FIG. 2B illustrates an exemplary interface for interacting with the unified messaging platform, according to a second example embodiment.

As described above, the unified messaging platform may provide a user interface 200 including three panes, e.g., a left rail 202, a center pane 204, and a right rail 206. As illustrated by FIG. 2B, the unified messaging platform may provide a variety of options for generating communications. For example, the unified messaging platform may provide a new message input field, e.g., new message input field 232, for sending an instant message, SMS, or other "text-like" communication. In aspects, new message input field 232 may allow entry of text, entry of commands, entry of user callouts, entry of hashtags, entry of images, entry of rich web content, entry of rich interactive content, etc. New message input field 232 may further include controls 268 for attaching files, inserting emoticons, etc. However, in at least some aspects, new message input field 232 may not provide for entry of recipients or a subject line. In response to inputting a message into a new message input field 232 and hitting "enter," a communication from a user may automatically post to a conversation as a new "text-like" message. According to further aspects, new message input field 232 may include optional controls 266 (denoted as an ellipsis) for expanding the new message input field 232 into an email interface object (e.g., email interface object 238 described below).

Alternatively, the unified messaging platform may provide a reply link 234 associated with each communication of a conversation. In some aspects, reply link 234 is displayed near each communication of a conversation, e.g., to the right of a sender or subject line for a communication (not shown), indented below a communication (shown), up and to the right of a communication (not shown), and the like. Alternatively, reply link 234 may not be displayed unless and until a communication is clicked, hovered over, touched or otherwise identified with an input device (e.g., mouse, pointer, etc.). Upon display and in response to selection of a reply link 234 associated with a particular communication, a message reply input field may be displayed (not shown). Similar to the new message input field 232, the message reply input field may allow entry of text, entry of commands, entry of hashtags, attachment of files, insertion of emoticons, etc. However, in this case, in response to inputting a message and hitting enter, a communication from the user may automatically post within a conversation thread 220 associated with the particular communication. In aspects, as illustrated by FIG. 2A, secondary communications 218b within a conversation thread 220 may be displayed as indented, bulleted, or otherwise offset below a primary or initial communication 218a (in above example, the "particular communication" may be referred to as a "primary communication").

Alternatively still, the unified messaging platform may provide an email control 236 for accessing an email interface object, e.g., email interface object 238, to send "email-like" communications. In aspects, email interface object 238 may allow similar actions to new message input field 232, such as an input field 276 for entry of text, entry of commands, entry of hashtags, etc., and controls 268 for attachment of files, insertion of emoticons, etc. Additionally, email interface object 238 may provide controls 278 for altering text font and size, bulleting text, etc., and controls 270 for sending, saving a draft email, deleting, etc. Email interface object 238 may further provide a recipient field 272 for inputting or selecting recipients and a subject field 274 for inputting a subject line, and the like. In response to inputting a message into an email interface object 238 and hitting enter, a communication from the user may automatically post to the conversation as a new "email-like" message.

As should be appreciated, the various features and functionalities of user interface 200 described with respect to FIG. 2B are not intended to limit associated systems and methods to the particular features and functionalities described. Accordingly, additional features and functionalities may be associated with the systems and methods described herein and/or some features and functionalities described may be excluded without departing from the systems and methods described herein.

Figure 2C:
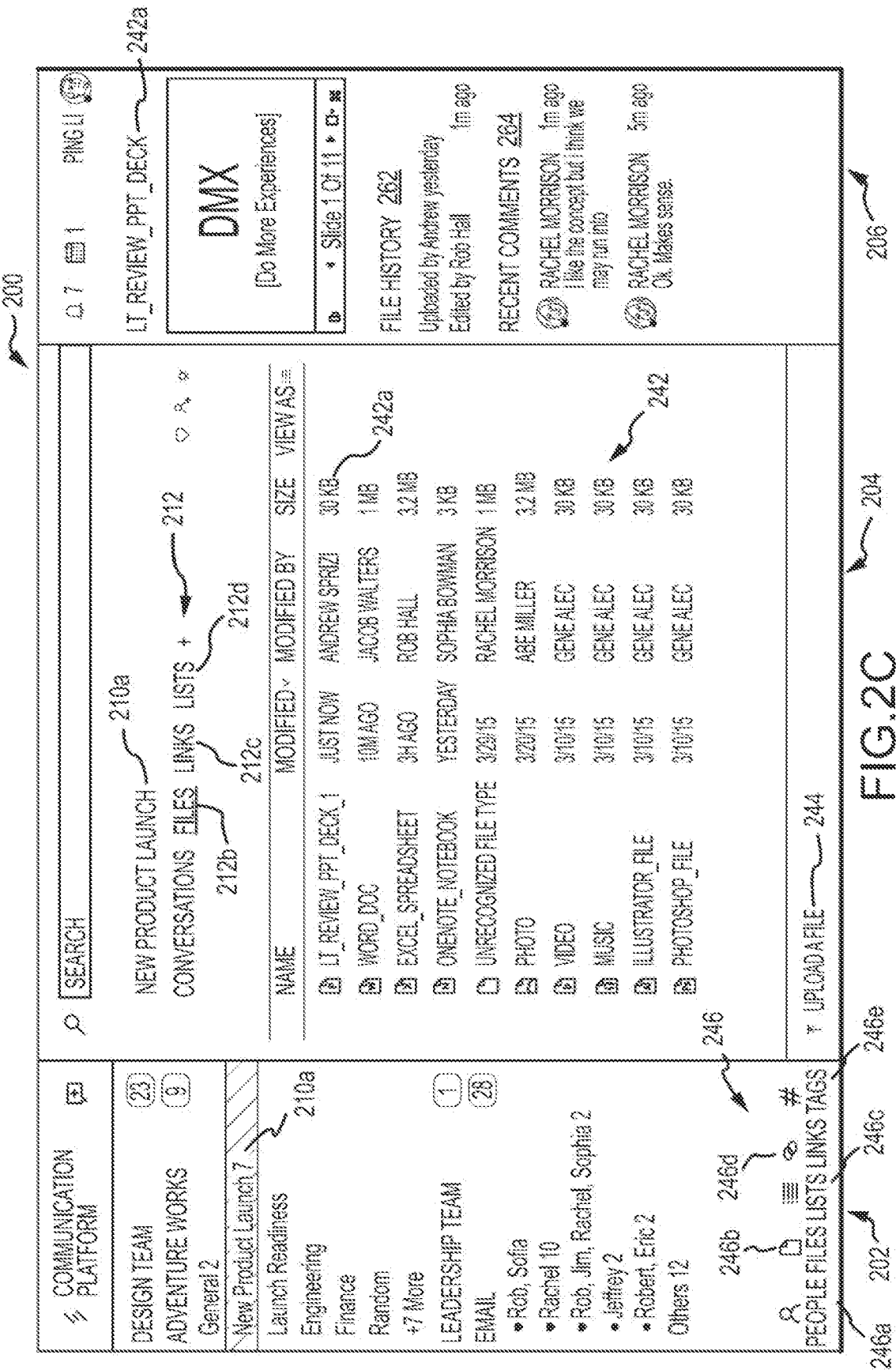
FIG. 2C illustrates an exemplary interface for interacting with the unified messaging platform, according to a third example embodiment.

FIG. 2C illustrates an exemplary interface for interacting with the unified messaging platform, according to a third example embodiment.

As described above, the unified messaging platform may provide a user interface 200 including three panes, e.g., a left rail 202, a center pane 204, and a right rail 206. Moreover, as described above, each tab 212 may display a different type of information associated with a category 210*a* in the center pane 204. For example, as illustrated by FIG. 2C, a second tab (e.g., files tab 212*b*) may be selected (denoted by underlining) to display files 242 shared between team members. Files 242 may include any type of file, e.g., document files, spreadsheet files, presentation files, image files, video files, audio files, note files, and the like.

In some aspects, files 242 displayed in files tab 212*b* include files that were sent as attachments to communications 218 between team members. That is, the unified messaging application may extract files sent as attachments and automatically save them in files tab 212*b*. In other aspects, as illustrated by FIG. 2C, a file upload field 244 may be provided. In response to selecting file upload field 244, one or more files 242 may be saved to the files tab 212*b* by a user. For example, in response to selection of file upload field 244, a browsing box (not shown) may be activated for retrieving a file for upload. Alternatively, a command may be entered (e.g., "/file") for retrieving a file for upload. Alternatively still, a file may be copied and pasted into file upload field 244. In aspects, any suitable method for uploading and saving a file to the files tab 212*b* may be implemented. In at least some aspects, a single version of a first file with a first file name exists in files tab 212*b* such that any annotations (e.g., revisions, comments, or other data) made to the first file are synchronized and stored within the single version. In some aspects, upon saving the first file with a second file name, a second file can be created, attached, and/or uploaded to files tab 212*b*.

According to further examples, a third tab (e.g., links tab 212*c*) may display links (e.g., hyperlinks) shared between team members. In some aspects, links displayed in the links tab 212*c* include links that were sent within the body of a communication or as attachments to a communication between team members. That is, the unified messaging application may extract links sent within or as attachments to communications and may automatically save them to the links tab 212*c*. In other aspects, a link upload field (not shown) may be provided. In response to selecting the link upload field, one or more links may be saved to the links tab 212*c* by a user. For example, in response to selection of a link upload field, a browsing box (not shown) may be activated for retrieving a link for upload. Alternatively, a command may be entered (e.g., "/link") for retrieving a link for upload. Alternatively still, a link may be copied and pasted into the link upload field. In aspects, any suitable method for uploading and saving a link to the links tab 212*c* may be implemented.

A fourth tab (e.g., lists tab 212*d*) may display list objects and/or other information, data, files, images, etc., shared between team members. In aspects, list objects may include lists, tables, charts, or other organized forms of data. In some aspects, list objects displayed in lists tab 212*d* include list objects that were sent within the body of a communication 218 or as an attachment to a communication 218 between team members. That is, the unified messaging application may extract list objects sent as attachments or within a message body and automatically save them to lists tab 212*d*. As used herein, a message body refers to content displayed within a communication (e.g., excluding recipient, sender, time stamp, subject information, confidentiality disclaimer, etc.) that need not be activated or opened for viewing.

In other aspects, a list object may be created or uploaded by a user within lists tab 212*d*. For example, a list creation control (not shown) may be provided for creating a list object. In some cases, in response to selecting the list creation control, a list object may be created and inserted in a message body and/or attached to a message. Upon creating the list object, the list object may be automatically saved to the lists tab 212*d*. Alternatively, a list upload field (not shown) may be provided. In response to selecting a list upload field, one or more list objects may be selected, uploaded and saved to the lists tab 212*d* by a user, as described similarly above. In at least some cases, a single copy of each list object may exist such that if data is updated in any view, e.g., within the communications tab 212*a* or the lists tab 212*d*, the list object is automatically updated and synchronized across all other views.

According to aspects, any number of tabs 212 may be created for organizing and sequestering various forms of information related to a category 210*a*. For example, a hashtag tab may be included to store various hashtags created within communications between team members. In additional examples, custom or extensibility tabs may be created, e.g., a tab for a spreadsheet dashboard, a tab for a webpage, a tab for a custom application, a tab for a system plugin, and the like.

In further aspects, additional interactive controls or links (e.g., controls 246) may be provided, e.g., in left rail 202, for quickly and easily accessing communications, files, lists, links, tags, etc., related to a team 208. For example, people control 246*a* may access team members and/or conversations stored in the team portal, files control 246*b* may access files stored in the team portal, lists control 246*c* may access lists stored in the team portal, links control 246*d* may access links stored in the team portal, and hashtags control 246*e* may access hashtags stored in the team portal. In some aspects, selection of a control 246 may display a corresponding tab view within the center pane 204. In other aspects, selection of a control 246 may display results for all categories within a team portal, e.g., in the form of search results associated with a particular control 246.

As illustrated by FIG. 2C, in response to selection of a files tab 212*b*, the right rail 206 may display different information than when a different tab 212 is viewed in center pane 204. For example, selecting or highlighting a file 242*a* in center pane 204 may cause information related to file 242*a* to be displayed in the right rail 206. For instance, a file history 262 for the file 242*a* may be displayed in the right rail 206. The file history 262 may include information such as a user identifier for a user who uploaded the file 242*a*, a user who authored the file 242*a* a user who edited the file 242a, a file creation date, a file revision date, and the like. The right rail 206 may further display recent comments 264 regarding file 242a. In aspects, any information related to file 242a may be displayed in right rail 206.

As should be appreciated, the various features and functionalities of user interface 200 described with respect to FIG. 2C are not intended to limit associated systems and methods to the particular features and functionalities described. Accordingly, additional features and functionalities may be associated with the systems and methods described herein and/or some features and functionalities described may be excluded without departing from the systems and methods described herein.

Figure 2D:
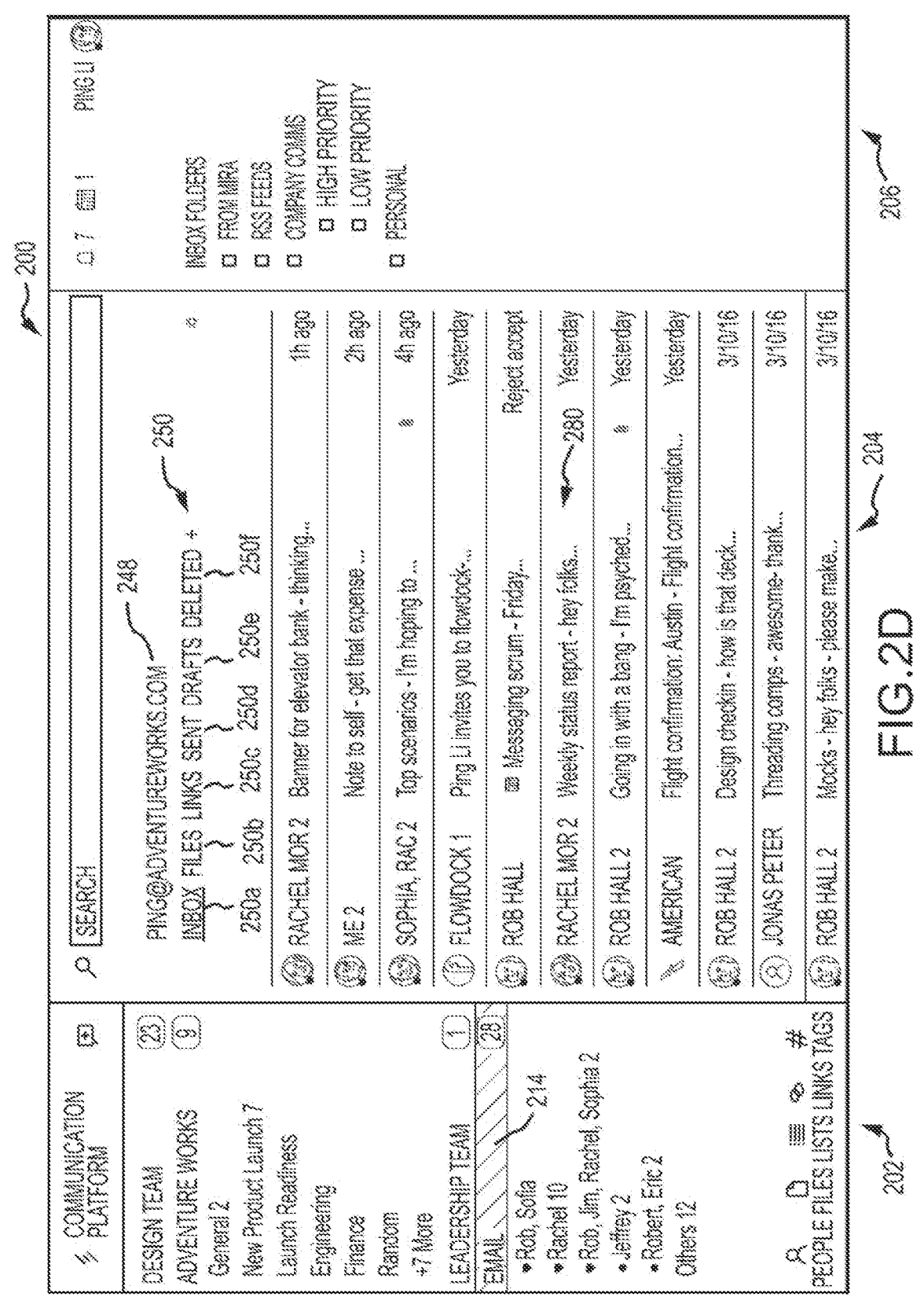

FIG. 2D illustrates an exemplary interface for interacting with the unified messaging platform, according to a fourth example embodiment.

As described above, the unified messaging platform may provide a user interface 200 including three panes, e.g., a left rail 202, a center pane 204, and a right rail 206. In further aspects, the left rail 202 may include an email portal 214. Unlike a team portal, email portal 214 may be an access point through which a particular user can view and interact with his or her email messages inside or outside of the context of a team. In aspects, in response to selection of email portal 214, a second pane, e.g., center pane 204, may display a user's email messages. Center pane 204 may further display a user identifier 248 as a header, e.g., a user email address, a user name, a user icon, and the like. Center pane 204 may provide one or more tabs 250 for organizing the user's email messages. Tabs 250 may include, for instance, an inbox tab 250a, a files tab 250b, a links tab 250c, a sent tab 250d, a drafts tab 250e, a deleted tab 250f, and the like. For example, a user's inbox of messages may be displayed in the center pane 204 in response to selection of inbox tab 250a (denoted by underlining). In some aspects, the user's inbox of messages may include all messages sent to the user, e.g., messages between team members, including internal and external users, as well as messages between entities and users that are not team members.

In some aspects, the user's email messages 280 in inbox tab 250a may be displayed in a summary list format (shown) in descending order based on a date the email message was received with the most recent email message displayed at the top of center pane 204. The summary list format may display a portion of each email message, e.g., a sender, a subject line, and a portion of text for each email message.

In alternative aspects, the user's email messages in inbox tab 250a may be displayed in a conversation thread format (not shown). A conversation thread format may display email messages which are replies to a primary email message as indented, bulleted, or otherwise offset below a primary email message. In at least some aspects, each conversation thread may be displayed in descending order based on a date the last email message in the conversation thread was received, with the most recent conversation thread displayed at the top of center pane 204. In this case, individual communications (e.g., communications that have not been replied to) may be interspersed among and between conversation threads in descending order based on a date the individual communication was received. In other aspects, each conversation thread may be displayed in ascending order based on a date the last email message in the conversation thread was received with the most recent conversation thread displayed at the bottom of center pane 204. In this case, individual communications may be interspersed among and between conversation threads in ascending order based on a date the individual communication was received.

In further aspects, email messages that have been opened or viewed may be displayed within the in inbox tab 250a of center pane 204 with normal text, whereas email messages that have not been opened or viewed may be displayed within the center pane 204 with at least portions of the email message in bold text (e.g., a sender and/or a subject line may be displayed with bold text).

As should be appreciated, the various features and functionalities of user interface 200 described with respect to FIG. 2D are not intended to limit associated systems and methods to the particular features and functionalities described. Accordingly, additional features and functionalities may be associated with the systems and methods described herein and/or some features and functionalities described may be excluded without departing from the systems and methods described herein.

FIG. 2E illustrates an exemplary interface for interacting with the unified messaging platform, according to a fifth example embodiment.

As described above, the unified messaging platform may provide a user interface 200 including three panes, e.g., a left rail 202, a center pane 204, and a right rail 206. As described above, in response to selection of email portal 214, center pane 204 may display a user's email messages. In some aspects, as illustrated by FIG. 2E, a user's email messages may be organized based on conversations 252 between one or more users. For example, as shown in left rail 202, a conversation 252a between a first user and a second user (e.g., Rachel) may be displayed separately from a conversation 252b between the first user, a third user (e.g., Rob) and fourth user (e.g., Sofia).

In aspects, by selecting a conversation 252 displayed in the left rail 202, communications between the one or more users may be displayed in center pane 204. As illustrated in FIG. 2E, conversation 252c has been selected and the communications 254 between the first user and the second user (e.g., Rachel), the third user (e.g., Rob), a fifth user (e.g., Jim), and a sixth user (e.g., Sophia) are displayed in center pane 204. In this example, the first user refers to the accessing user (e.g., Ping Li) identified by user name 256a and user icon 256b.

In aspects, communications 254 of conversation 252c may be displayed in descending order based on a date each communication 254 was received with the most recent communication 254 displayed at the top of center pane 204. In other aspects, communications 254 of conversation 252c may be displayed in ascending order based on a date each communication 254 was received with the most recent communication 254 displayed at the bottom of center pane 204.

In further aspects, information related to conversation 252c may be organized by tabs or pages. For example, each tab 258 may display a different type of information associated with conversation 252c in the center pane 204. When selected, a tab 258 may be identified by highlighting, with a different font or font color, by outlining, underlining, and the like. As illustrated by FIG. 2E, a first tab (e.g., conversation tab 258a) may display the communications 254 between the first user, second user, third user, fifth user and sixth user. Additional tabs, described in further detail above, may include a second tab (e.g., files tab 258b), a third tab (e.g., links tab 258c), a fourth tab (e.g., lists tab 258d), and the like, for displaying files, links, lists, etc., shared between participants in the conversation 252c. For example, as illustrated by FIG. 2E, a list object 260 was inserted in communication 254a from the second user (e.g., Rachel). In aspects, as described above, the list object 260 may be accessed from the conversation tab 258*a* or from the lists tab 258*d*.

As illustrated by FIG. 2E, when viewing a conversation 252*c* between the first user, second user, third user, fifth user and sixth user, the right rail 206 may display information associated with the conversation 252*c* and/or the users participating in the conversation 252*c*. For example, the right rail 206 may display group availability 282 for the users participating in the conversation 252*c*. The right rail 206 may further display common meetings 284 between the users participating in the conversation 252*c*. In aspects, any information related to conversation 252*c* and/or the participating users may be displayed in right rail 206.

As should be appreciated, the various features and functionalities of user interface 200 described with respect to FIG. 2E are not intended to limit associated systems and methods to the particular features and functionalities described. Accordingly, additional features and functionalities may be associated with the systems and methods described herein and/or some features and functionalities described may be excluded without departing from the systems and methods described herein.

Figure 2F:
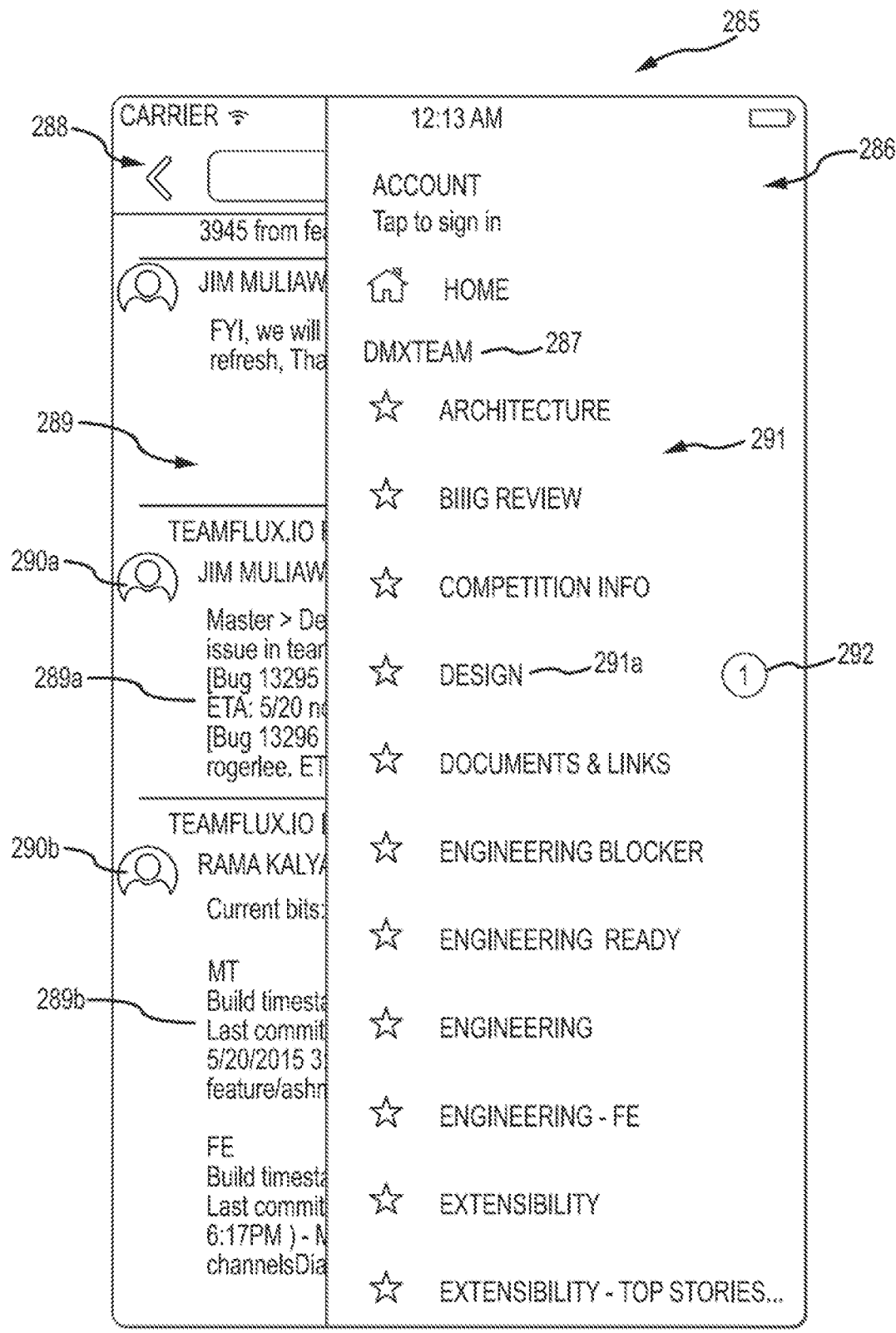
FIG. 2F illustrates an exemplary mobile interface for interacting with the unified messaging platform, according to an example embodiment.

FIG. 2F illustrates an exemplary mobile interface for interacting with the unified messaging platform, according to an example embodiment.

In aspects, a version of the unified messaging platform may provide a user interface 285 for mobile devices. The mobile user interface 285 may provide one or more panes or windows for viewing communications, files, lists, links, etc., associated with one or more teams of which a user is a member. In some aspects, a second pane may be displayed (e.g., second pane 288) in response to swiping a first pane (e.g., first pane 286) in a left-to-right direction or a right-to-left direction.

As illustrated, first pane 286 displays one or more teams (e.g., team 287) and one or more categories (e.g., categories 291). In aspects, a notification (e.g., notification 292) may be displayed near a category (e.g., category 291*a*) when a new communication, file, list, hyperlink, etc., has been received within the category 291. As further illustrated, second pane 288 displays one or more communications 289 (e.g., communications 289*a* and 289*b*), which are each associated with a sender (e.g., senders 290*a* and 290*b*).

As should be appreciated, the various features and functionalities of user interface 285 described with respect to FIG. 2F are not intended to limit associated systems and methods to the particular features and functionalities described. Accordingly, additional features and functionalities may be associated with the systems and methods described herein and/or some features and functionalities described may be excluded without departing from the systems and methods described herein.

Figure 2G:
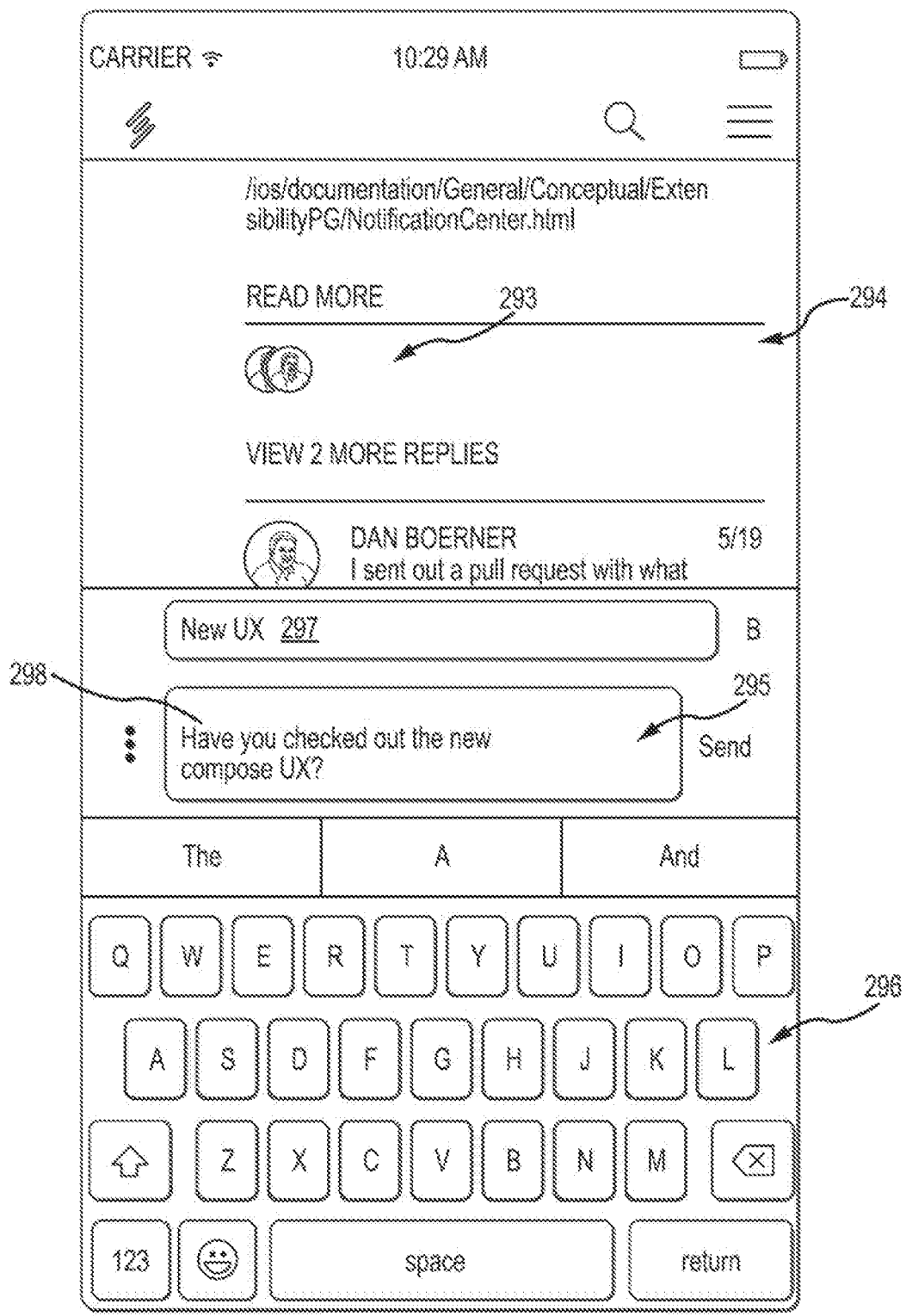
FIG. 2G illustrates an exemplary mobile interface for interacting with the unified messaging platform, according to a second example embodiment.

FIG. 2G illustrates an exemplary mobile interface for interacting with the unified messaging platform, according to a second example embodiment.

As described above, mobile user interface 285 may allow a user to view a conversation (e.g., conversation 293) in a conversation pane (e.g., conversation pane 294). The mobile user interface 285 may further provide a new message input field 295 and an input interface 296 for inputting and sending communications to participants of the conversation 293. In aspects, when a communication is sent to the participants of an ongoing conversation (e.g., conversation 293), new message input field 295 does not require recipient information but may provide a subject input field, e.g., subject input field 297, for inputting a subject of the communication, e.g., "New UX." In some aspects, new message input field 295 may be similar to an instant, chat, SMS, or similar messaging interface. In other aspects, new message input field 295 may provide functionality similar to an email messaging interface (e.g., allowing for attaching documents, list objects, images, etc.). As illustrated, a communication 298 has been partially input into new message input field 295.

As should be appreciated, the various features and functionalities of user interface 285 described with respect to FIG. 2G are not intended to limit associated systems and methods to the particular features and functionalities described. Accordingly, additional features and functionalities may be associated with the systems and methods described herein and/or some features and functionalities described may be excluded without departing from the systems and methods described herein.

Figure 3:
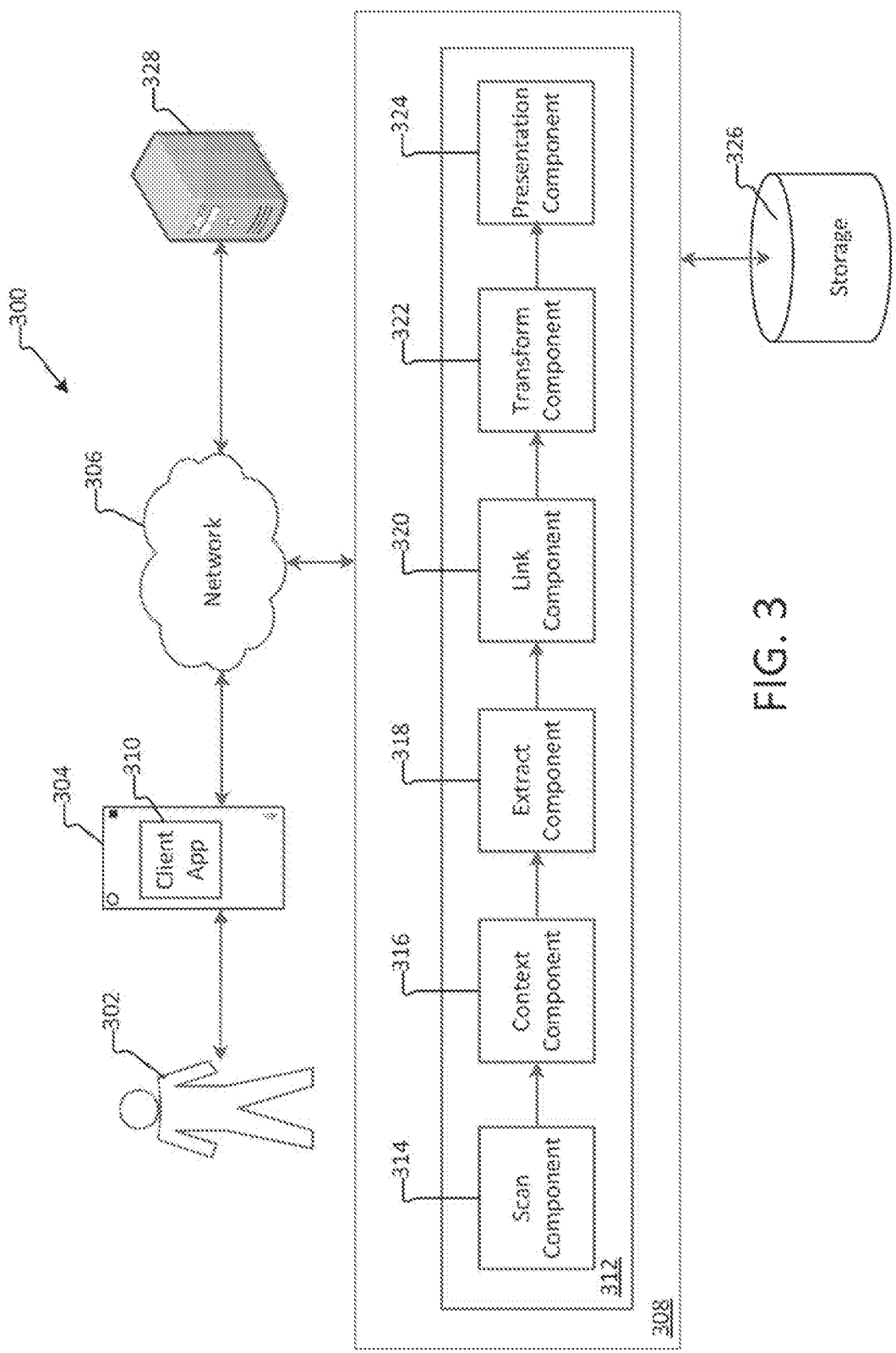
FIG. 3 illustrates an exemplary system implemented on a computing device for message handling, according to an example embodiment.

FIG. 3 illustrates an exemplary system implemented on a computing device for message handling, according to an example embodiment.

In aspects, a client computing device 304 may implement a unified messaging application. In some aspects, client computing device 304 may implement a client application 310 for interfacing with unified messaging application 312 implemented on a server computing device 308. In a basic configuration, the client computing device 304 may be described similarly to client computing device 104. However, any suitable client computing device for implementing a unified messaging application 312, or client application 310 of such application, may be utilized.

In aspects, as illustrated in FIG. 3, the unified messaging application 312 may be implemented on a server computing device 308. In a basic configuration, the server computing device 308 may be described similarly to server computing device 106. The server computing device 308 may provide data to and from the client computing device 304 through a network 306, where network 306 is described similarly to network 108. In further aspects, the unified messaging application 312 may be implemented on more than one server computing device 308, such as a plurality of server computing devices 308. As discussed above, the server computing device 308 may provide data to and from the client computing device 304 through the network 306. In some cases, a textual or voice input may be received at the client computing device 304 and transmitted over the network 306 for processing by unified messaging application 312 at the server computing device 308.

As illustrated in FIG. 3, the unified messaging application 312 may include a scan component 314, a context component 316, an extract component 318, a link component 320, a transform component 322 and a presentation component 324. The various components may be implemented using hardware, software, or a combination of hardware and software. The unified messaging application 312 may be configured to receive and process textual and/or voice input messages. In one example, a textual and/or voice input may include phrases, words, and/or terms in the form of a textual and/or spoken language input (e.g., a user text or voice message). In this regard, the unified messaging application 312 may be configured to receive the textual and/or spoken language input from user 302. In aspects, the unified messaging application 312 may be configured to convert spoken language input into a textual communication between team members. For example, the unified messaging application 312 may include standard speech recognition techniques known to those skilled in the art such as "automatic speech recognition" (ASR), "computer speech recognition", and "speech to text" (STT). In some cases, the unified messaging application 312 may include standard text to speech techniques known to those skilled in the art such as "text to speech" (TTS).

As illustrated by FIG. 3, the client computing device 304 and the server computing device 308 may further be in communication with storage 326 that stores parameters, configuration information, communications, images, documents, list objects, or any other information accessed by unified messaging application 312. Storage 326 may be a local or remote database, within an enterprise intranet, or in distributed locations over the Internet. In aspects, storage 326 may include a plurality of textual files, including formatted, markup or plain text in any file format such as digital word processing documents, spreadsheets, presentations, webpages, text messages, tweets, email messages, and the like.

In aspects, scan component 314 may scan messages for embedded content, hyperlinks, textual or graphical content, image content, video content, attached data, command lines, user callouts, and the like. In some aspects. "attached data" may include an "attached file," which may be stored in a file format, e.g., an image file, a document file, a spreadsheet file, a presentation file, a code file, etc. In other aspects, "attached data" may include data that is not stored in a file format, e.g., a blob. Scan component 314 may implement any suitable technique for scanning messages, including common techniques presently known or techniques developed in the future. Additionally, scan component 314 may scan one or more files attached to a message. An approach to extract structured data from a document uses a "wrapper" that relies on the structure of the document to extract specific pieces of information. Recent advances in extraction techniques rely on semi-structured information extraction from HTML pages, natural language processing (NLP) techniques such as speech taggers, and semantic tagging and shallow parsing to build relationships between various components within a sentence. These approaches utilize recognizable keywords to identify specific relationships or patterns, e.g., in HTML DOM trees, and are more resilient to changes in the structure of the document.

In some cases, annotations such as edits made to textual or other content and/or comments inserted within an attached file may be identified by scan component 314. As used herein, an "edit" may include any insertion or deletion within the content and a "comment" may include any notation appended to the content. In aspects, any of the techniques described above, or any other technique presently known or developed in the future, may be implemented by scan component 314 to identify one or more annotations within an attached file.

In some cases, a structure of a message and/or an attached file may be characterized by identifiers or otherwise indexed. In an example, for a message and/or an attached file with a hierarchical structure, content may be indexed by nested identifiers referencing different levels and/or positions of content within the hierarchical structure. That is, an identifier for a sentence may be nested within an identifier for a paragraph, which may be nested within an identifier for a page, and so on. In other aspects, for a message and/or attached file without a hierarchical structure, content may be indexed by identifiers referencing positions of content within the structure (e.g., a linear or other non-hierarchical structure). Moreover, a layout for the content of a message and/or an attached file (e.g., for transmission or display) may be defined by metadata or otherwise.

In some aspects, an annotation (e.g., edit, comment, or other data) may be indexed to the structure of an attached file. For instance, the annotation may be associated with one or more identifiers referencing a level and/or position of the annotation within the content of the attached file. In other aspects, an excerpt (e.g., any portion of an attached file, including one or more annotations along with adjacent content) may be indexed to the structure of an attached file. For instance, the excerpt may be associated with one or more identifiers referencing a level and/or position of the excerpt within the content of the attached file. In aspects, scan component 314 may detect the one or more identifiers (or other indexing) that associates an annotation and/or an excerpt to the structure of an attached file. In some aspects, the one or more identifiers specifying a content structure and/or the metadata specifying a content layout may be detected by scan component 314 in the form of computer-readable instructions or information.

Additionally, context component 316 may evaluate each message and/or attached file to determine context. Context refers to any feature or condition related to the message and/or attached file. For instance, context may relate to the message, e.g., a type of client computing device 304 that the message originated from and/or will be routed to, a type of messaging application the message originated from and/or will be routed to, textual queues regarding a user intent, global positioning system (GPS) data associated with the message or its sender, a timestamp indicating when the message was sent, etc. In further aspects, context may relate to an attached file and/or to annotations or excerpts within an attached file, e.g., a page number of the file associated with an annotation or excerpt, a line number of a page of the file associated with an annotation or excerpt, a position of a paragraph including an annotation or excerpt, a position of a sentence including an annotation or excerpt, a timestamp identifying when an annotation was made, a name of an editor for an annotation, a name of an author for the file, a timestamp identifying when the file was created, and the like. In some aspects, details regarding the context of a message, attached file, annotation, excerpt, etc., may be detected by context component 316 in a form readable or understandable by a user.

Extract component 318 may extract at least a portion of content and/or data from an attached file. For example, an annotation or excerpt may be extracted from an attached file via any suitable means. In some aspects, an annotation or excerpt may be extracted along with a structure and context associated with the attached file. For example, in addition to extracting the annotation or excerpt, extract component 318 may extract anchor information with regard to the annotation or excerpt. Anchor information may include any structural or contextual information associated with an annotation or excerpt, including information in a computer-readable or user-readable format. For instance, anchor information may include one or more identifiers and/or other indexing that associates the annotation or excerpt to a structure of an attached file. Additionally, anchor information may include descriptive information regarding a context of the annotation or excerpt. e.g., an editor name; an author name; a timestamp for an annotation; as well as descriptive position information such as a line, page, paragraph, sentence, word, phrase, etc., associated with an annotation or excerpt within an attached file; and the like. In aspects, anchor information may be stored with the extracted content as computer-readable metadata or otherwise.

Link component 320 may create one or more links between the extracted portion of content and the attached file. As detailed above, an annotation may be extracted with a structure and context associated with the attached file. In some cases, an association between the structure of the attached file and the extracted content may be created or maintained. For instance, links may be created between the extracted content and the attached file using the one or more identifiers and/or other indexing that associates the extracted content to the structure of the attached file. In aspects, upon creating the links between the extracted portion of content and the attached file, the extracted content may be referred to as "active extracted content." In some examples, when a user selects active extracted content, the attached file may be automatically opened to a location associated with the extracted content. Additionally or alternatively, when a user annotates (e.g., by editing or inserting comments) active extracted content, the annotations may be automatically synchronized with the attached file.

When a receiving application is not unified messaging application 312 or client application 310, transform component 322 may transform the message and/or extracted content into a format and/or representation that is understood or readable by the receiving application, e.g., a third party messaging application, an enterprise messaging application, and the like. In some aspects, transform component 322 may reformat the message and/or extracted content into a structure renderable by the receiving application. In further aspects, transform component 322 may translate the message and/or extracted content into a representation readable by the receiving application.

Presentation component 324 may cause the message and/or extracted content to be displayed, rendered, transmitted, or otherwise presented in a format and/or representation readable by a receiving endpoint and/or a receiving application. For instance, the message and/or extracted content may be displayed in a user interface associated with the unified messaging application 312 or client application 310. Traditionally, when collaborating regarding an annotated file, users may have received the annotated file attached to an email message. Thereafter, a first recipient may have opened the attached file, entered additional annotations in the form of additions, deletions, comments, etc., summarized their annotations in a body of a second email message (e.g., a reply message), and attached a copy of the newly annotated file. Similarly, a second recipient may perform substantially the same steps, resulting in at least three different versions of an annotated file (e.g., the first version sent in the original message and two additional versions created by the first and second recipients). Not only does this create multiple potentially conflicting versions of the annotated file, it requires users to perform additional actions such as summarizing their annotations in an email message. In aspects disclosed herein, active extracted content enables multiple users to enter annotations within a single version of an annotated file, as well as automatically presenting the annotations in-line with the message body, which eliminates the need to summarize annotations.

Additionally or alternatively, presentation component 324 may cause the message and/or extracted content to be displayed, rendered, transmitted, or otherwise presented in a format and/or representation readable by a third party messaging application, an enterprise messaging application, a word processing application, a collaborative authoring application, and the like. In this case, recipients may benefit from the inline display of annotations to an attached file, recipients may not benefit from interaction with a single version of an annotated file.

According to further aspects, the client computing device 304 and/or server computing device 308 may be in communication with a third party computing device 328. Third party computing device 328 may be described similarly to server computing device 106 or server computing device 308. In aspects, third party computing device 328 may host one or more third party messaging applications, an enterprise messaging application, a word processing application, a collaborative authoring application, etc. In at least some aspects, authentication (e.g., authentication 112) may be required to access third party computing device 328.

As should be appreciated, the various devices, components, etc., described with respect to FIG. 3 are not intended to limit the systems and methods to the particular components described. Accordingly, additional topology configurations may be used to practice the methods and systems herein and/or some components described may be excluded without departing from the methods and systems disclosed herein.

Figure 4:
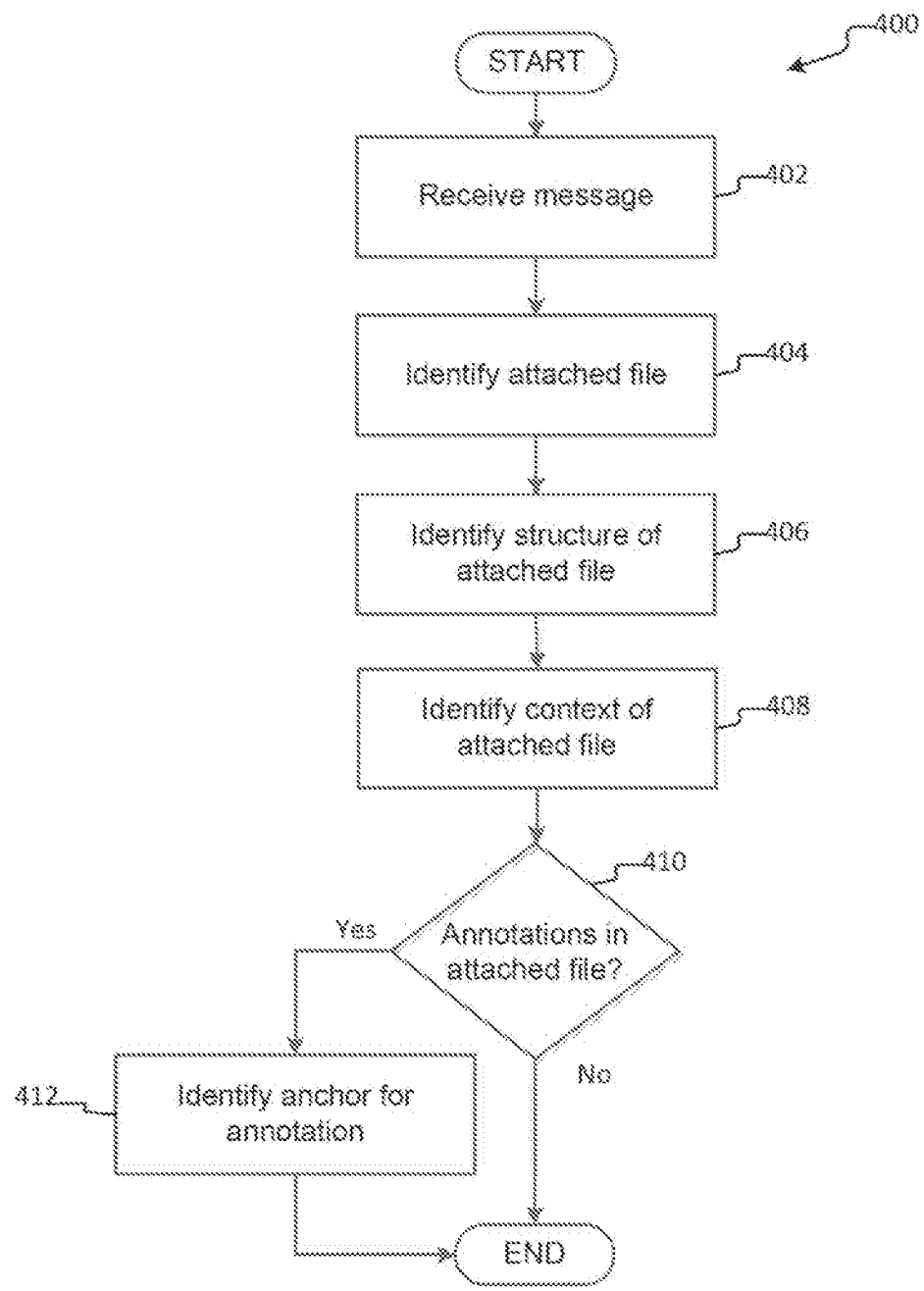
FIG. 4 illustrates an exemplary method for scanning a message with an attached file, according to an example embodiment.

FIG. 4 illustrates an exemplary method for scanning a message with an attached file, according to an example embodiment.

Method 400 begins with receive operation 402, where a message is received by a unified messaging application. The message may be of any type or format, including an email message, SMS message, instant message, and the like. In some cases, the message including any attached files may be received from a sender at a second endpoint who is registered with one or more of the unified messaging application, an enterprise messaging application, a third party email messaging application, an SMS messaging application associated with a cellular service plan, an instant messaging application, or otherwise. In other cases, the message including any attached files may be received as input by an "accessing user" at a first endpoint, where the accessing user inputs content into a new message input field, an email interface object, a message reply input field, etc., associated with the unified messaging application.

At identify attached file operation 404, content of the message may be scanned for an attached file by any suitable means. In aspects, attached files may include video content, audio content, voicemail messages, images, documents, spreadsheets, presentations, and the like.

At identify structure operation 406, a structure of the attached file is determined. For example, any suitable technique for scanning the attached file may be employed, including common techniques presently known or techniques developed in the future. Structured data may be identified using a "wrapper." semi-structured information such as HTML may be identified, natural language processing (NLP) techniques may be used to build relationships between various components within textual content, image and/or video detection techniques may be used, etc.

In some aspects, an attached file may not include a hierarchical structure, and content may be indexed by identifiers referencing positions of content within a linear or other non-hierarchical structure. Alternatively, an attached file may involve a hierarchical structure of file parts, such as a title of the file, an author or creator of the file, a body of the file, metadata for the file, etc. In some cases, the body of a file (e.g., file body) may be textual, while in other cases the file body may include structured data (e.g., columns and rows of data cells), or may include an image, a video, a hyperlink, or some combination thereof. In aspects, a structure of a file body may involve a hierarchical structure of elements, such as textual elements, data cell elements, column elements, row elements, image elements, video elements, hyperlink elements, and the like. In aspects, the hierarchical structure of elements may be described by nested identifiers or other indexing.

In a first example, a file body may include structured textual content. For instance, the structured textual content may include a hierarchical structure of elements such as one or more page elements, chapter elements, section elements, paragraph elements, line elements, sentence elements, and the like. In some examples, each element may be associated with a set of nested identifiers, e.g., an identifier associated with a sentence element, which is associated with a line element, which is associated with a paragraph element, which is associated with a page element, which is associated with a section element, which is associated with a chapter element, and so on. In aspects, a particular sentence element may be uniquely defined by one or more identifiers associated with a line element, paragraph element, page element, section element, chapter element, and so on.

Additionally or alternatively, a file body may include a form of structured data, e.g., a table, a spreadsheet, a list object, or some combination thereof, and the structured data may include a hierarchical structure of elements. For instance, where the structured data includes data values within data cells located at rows and columns within a table or spreadsheet, the structured data may include a hierarchical structure of elements such as data value elements, data cell elements, row elements, column elements, sheet (or page) elements, and the like. Each element may be associated with a set of nested identifiers, e.g., an identifier associated with a data cell element, which is associated with a row element, which is associated with a column element, which is associated with a sheet element, and so on. In aspects, a particular data cell element may be uniquely defined by one or more identifiers associated with one or more of the data cell element, row element, column element, sheet element, etc.

In addition to a structure, a layout for the attached file may be determined. In aspects, a layout defines formatting (e.g., page formatting, etc.) for the transmission and/or display of the attached file. For example, the layout for an attached file may be detected from metadata associated with the attached file. In aspects, the one or more identifiers specifying a content structure and/or the metadata specifying a content layout may be identified in the form of computer-readable instructions or information.

At identify context operation 408, a context associated with the attached file may be identified. For instance, context related to the attached file may include a type of file formatting for the attached file (e.g., .xls, .docx, .jpeg, .pdf, and the like), a type of application the attached file originated from and/or will be routed to, a timestamp indicating when the attached file was created, an author of the attached file, a title of the attached file, etc. In some aspects, details regarding the context of the attached file may be detected in a form that is readable or understandable by a user.

At determine annotation operation 410, it may be determined whether the attached file includes one or more annotations. An annotation includes edits made to textual or other content and/or comments appended within the attached file. An "edit" includes any insertion and/or deletion. In aspects, the attached file may be scanned by any suitable means to identify annotations, including scanning the content of the attached file and/or associated metadata. If the attached file includes one or more annotations, the method proceeds to identify annotation structure operation 412. Alternatively, if the attached file does not include one or more annotations, the method ends.

At identify annotation anchor operation 412, anchor information (or "anchors") relating the annotation to the attached file may be identified. In aspects, a location of the annotation may be indexed to the structure of the attached file. For instance, the annotation may be associated with one or more identifiers specifying a level and/or position of the annotation within a structure of the attached file, whether the structure is hierarchical or not, as described above. In aspects, the location of the annotation within the structure of the attached file may be included in the anchor information in the form of computer-readable instructions or information.

Additionally, anchor information may include a context of the annotation within the attached file. For instance, the context of the annotation within the attached file may include page number(s) of the attached file associated with the annotation, line number(s) of a page of the attached file associated with the annotation, a position of one or more paragraphs including the annotation, a position of one or more sentences including the annotation, a timestamp identifying when the annotation was made, a name of an editor for the annotation, and the like. In some aspects, details regarding the context of the annotation may be included in the anchor information and may be in a form readable by a user.

As should be appreciated, operations 402-412 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 5:
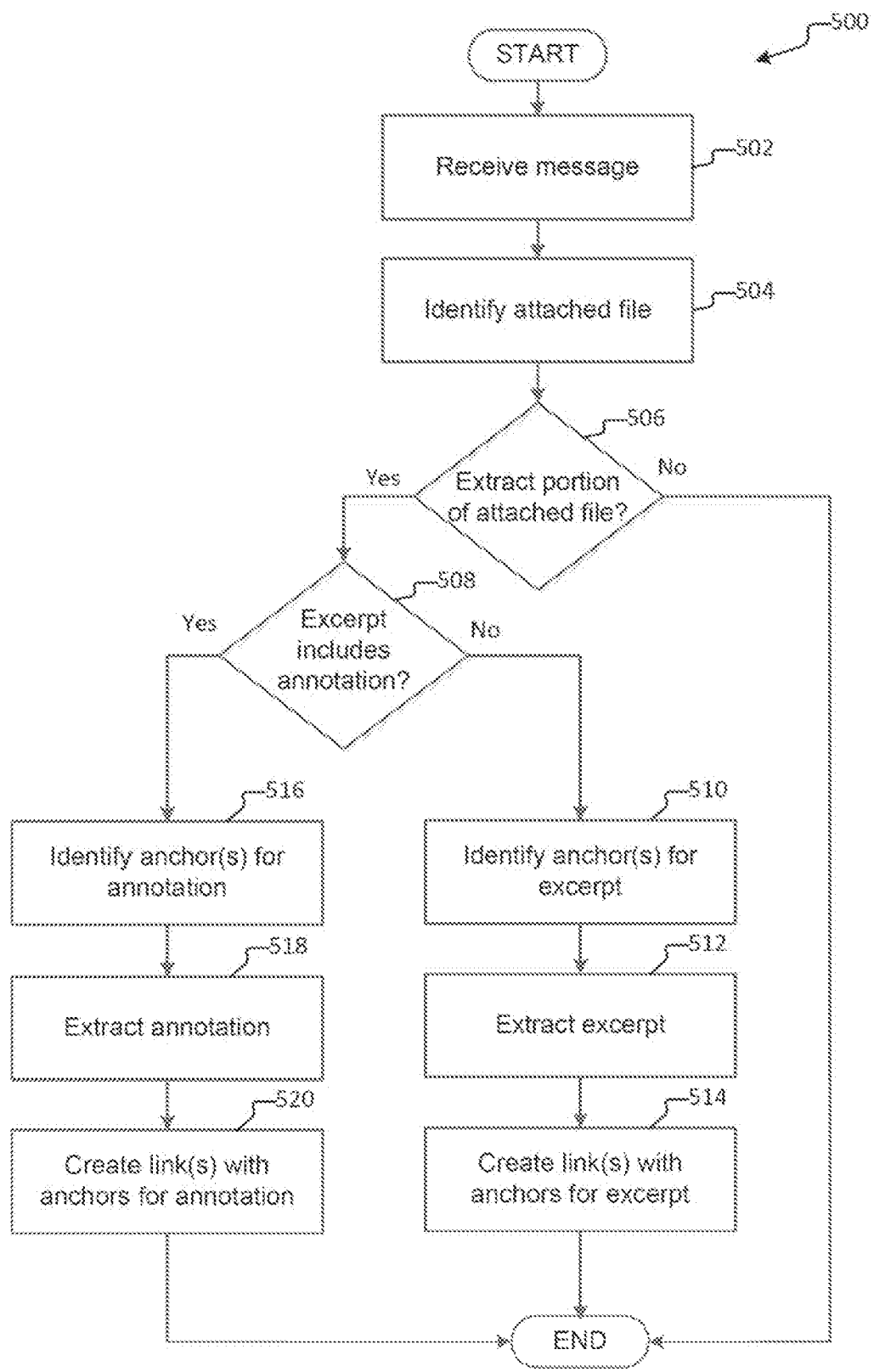
FIG. 5 illustrates an exemplary method for extracting at least a portion of content from an attached file, according to an example embodiment.

FIG. 5 illustrates an exemplary method for extracting at least a portion of content from an attached file, according to an example embodiment.

Method 500 begins with receive operation 502, where a message is received by a unified messaging application. The message may be of any type or format, including an email message, SMS message, instant message, and the like. In some cases, the message and any attached files may be received from a sender at a second endpoint who is registered with one or more of the unified messaging application, an enterprise messaging application, a third party email messaging application, an SMS messaging application associated with a cellular service plan, an instant messaging application, or otherwise. In other cases, the message and any attached files may be received as input by an accessing user at a first endpoint associated with the unified messaging application.

At identify attached file operation 504, content of the message may be scanned for an attached file by any suitable means, as described with reference to identify attached file operation 404. In aspects, attached files may include video content, audio content, voicemail messages, images, documents, spreadsheets, presentations, and the like.

At determination operation 506, it is determined whether at least a portion of the attached file should be extracted. In some aspects, it may be determined to extract at least a portion of an attached file in response to evaluating one or more factors, e.g., whether the attached file includes images, whether the attached file includes one or more annotations, etc. In some examples, the excerpt may include a substantial portion of the attached file (e.g., where the attached file is an image or a video). When it is determined to extract at least a portion of the attached file (referred to hereinafter as "excerpt"), the method proceeds to determination operation

508. Alternatively, if it is determined not to extract at least a portion of the attached file, the method ends.

At determination operation 508, it is determined whether the excerpt includes one or more annotations. An annotation includes edits made to textual or other content and/or comments appended within the portion of the attached file, as described above. If the excerpt includes one or more annotations, the method proceeds to identify anchor operation 516. Alternatively, if the excerpt does not include one or more annotations, the method proceeds to identify anchor operation 510.

At identify anchor operation 510, anchor information (or "anchors") relating the excerpt to the attached file may be identified. In aspects, a location of the excerpt may be indexed to the structure of the attached file. That is, the excerpt may be associated with one or more identifiers specifying a level and/or position of the excerpt within a structure of the attached file, whether the structure is hierarchical or not, as described above. In aspects, the location of the excerpt within the attached file may be included in the anchor information in the form of computer-readable instructions or information. In some examples, the excerpt may include a substantial portion of the attached file (e.g., where the attached file is an image or a video). In this case, the anchor information may include an identifier associated with the attached file (e.g., a file identifier).

Additionally, the anchor information may include a context of the excerpt within the attached file. For instance, the context of the excerpt within the attached file may include page number(s) of the attached file associated with the excerpt, line number(s) of the page(s) of the attached file associated with the excerpt, a position of one or more paragraphs including the excerpt, a position of one or more sentences including the excerpt, a timestamp identifying when the excerpt was created, and the like. In some examples, the excerpt may include a substantial portion of the attached file (e.g., where the attached file is an image or a video). In this case, context of the excerpt may include a timestamp indicating when the attached file was created, an author of the attached file, and the like. In some aspects, details regarding the context of the excerpt may be included in the anchor information and may be in a form readable by a user.

At extract operation 512, the excerpt may be extracted from the attached file by any suitable means. For example, extraction may include copying the excerpt. Additionally, the excerpt may be extracted along with the anchor information for the excerpt, as identified above. More specifically, the anchor information may include the one or more identifiers and/or other indexing in a computer-readable form that associate the excerpt to the structure of the attached file. Additionally, anchor information may include descriptive information in a user-readable form regarding a context of the excerpt, e.g., an author name; a creation date for the excerpt; and in some cases, descriptive position information such as a line(s), page(s), paragraph(s), sentence(s), etc., associating the excerpt within the attached file; and the like.

At create links operation 514, links may be established between the excerpt and the attached file. In aspects, the links may be created using at least the computer-readable identifiers or other indexing that associates the excerpt to the structure of the attached file. When the excerpt includes a substantial portion of the attached file, the excerpt may be linked to a file identifier for the attached file. In aspects, upon creating the links between the excerpt and the attached file, the excerpt may be referred to as an "active excerpt." In some examples, when a user selects the active excerpt, the attached file may be automatically opened to a location associated with the excerpt. Additionally or alternatively, when a user annotates (e.g., by editing or inserting comments) the active excerpt (e.g., within a message), the annotations may be automatically synchronized with the attached file.

When it is determined that the excerpt contains an annotation, at identify anchor operation 516, anchor information (or "anchors") relating the annotation to the attached file may be identified. In aspects, a location of the annotation may be indexed to the structure of the attached file, as described above for an excerpt. That is, the annotation may be associated with one or more identifiers specifying a level and/or position of the annotation within a structure of the attached file, whether the structure is hierarchical or not, as described above. In aspects, the location of the annotation within the attached file may be included in the anchor information in the form of computer-readable instructions or information.

Additionally, the anchor information may include a context of the annotation within the attached file. For instance, the context of the annotation within the attached file may include page number(s) of the attached file associated with the annotation, line number(s) of the page(s) of the attached file associated with the annotation, a position of one or more paragraphs including the annotation, a position of one or more sentences including the annotation, a timestamp identifying when the annotation was edited, and the like. In some aspects, details regarding the context of the annotation may be included in the anchor information and may be in a form readable by a user.

At extract operation 518, the annotation may be extracted from the attached file by any suitable means. For example, extraction may include copying the annotation. Additionally, the annotation may be extracted along with the anchor information for the annotation, as identified above. More specifically, the anchor information may include the one or more identifiers and/or other indexing in a computer-readable form that associate the annotation to the structure of the attached file. Additionally, anchor information may include descriptive information in a user-readable form regarding a context of the annotation, e.g., an editor name; an edit date for the annotation; as well as descriptive position information such as a line(s), page(s), paragraph(s), sentence(s), etc., associating the annotation within the attached file; and the like.

At create links operation 520, links may be established between the annotation and the attached file. In aspects, the links may be created using at least the computer-readable identifiers or other indexing that associates the annotation to the structure of the attached file. In aspects, upon creating the links between the annotation and the attached file, the annotation may be referred to as an "active annotation." In some examples, when a user selects the active annotation, the attached file may be automatically opened to a location associated with the annotation. Additionally or alternatively, when a user annotates (e.g., by revising or inserting comments) the active annotation (e.g., within a message), the annotations may be automatically synchronized with the attached file.

As should be appreciated, operations 502-520 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 6:
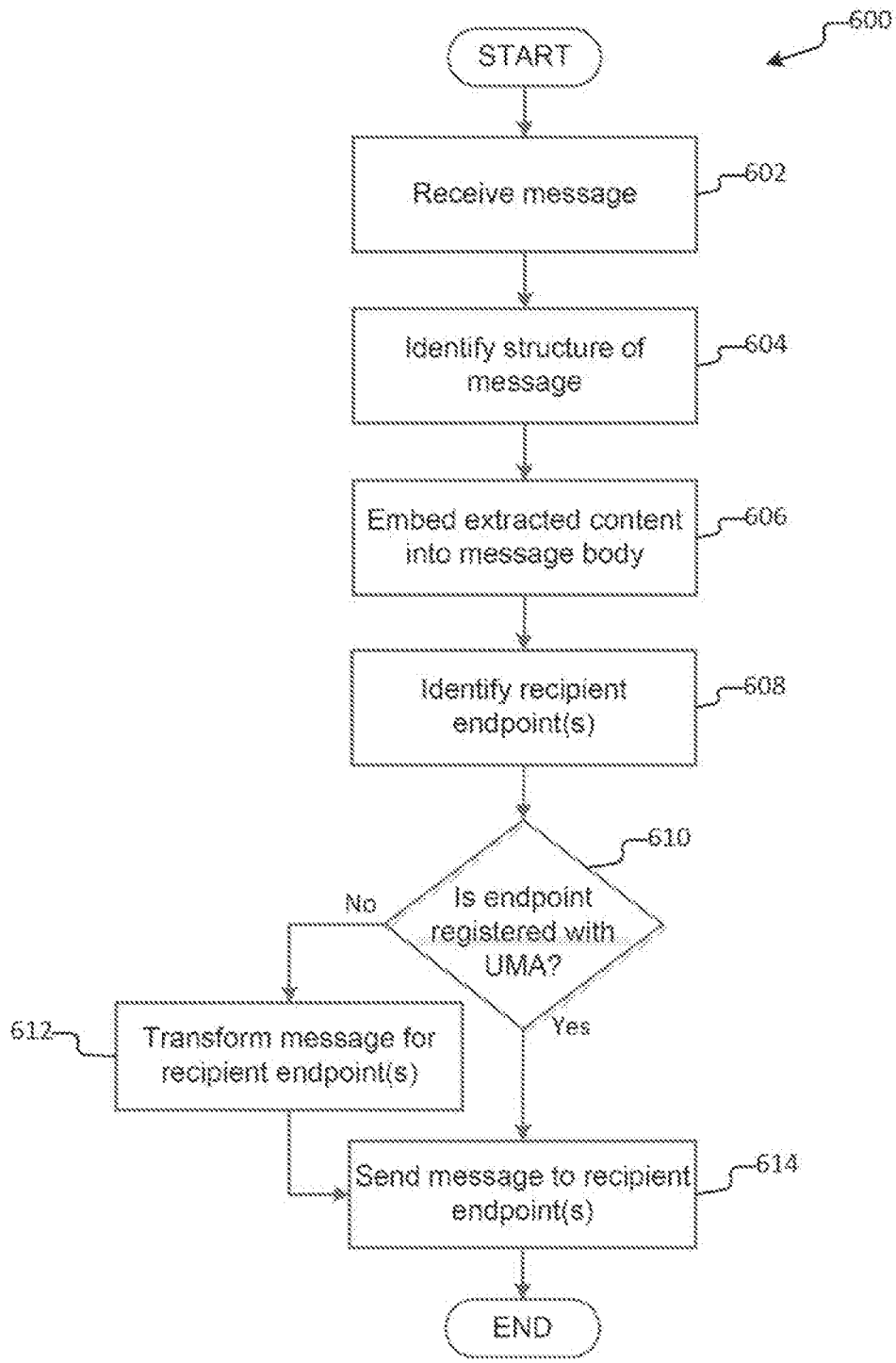
FIG. 6 illustrates an exemplary method for inserting at least a portion of extracted content into a message, according to an example embodiment.

FIG. 6 illustrates an exemplary method for inserting at least a portion of extracted content into a message, according to an example embodiment.

Method 600 begins with receive operation 602, where a message is received by a unified messaging application, as described above for receive operation 402 and receive operation 502.

At identify structure operation 604, a structure of the message is identified. In aspects, a message may include one or more parts, such as a message body, subject line, recipient field, sender field, time stamp, date stamp, one or more attachments, signature block, confidentiality disclaimer, etc. Additionally, in some aspects, a message body may further involve textual content such as a salutation, one or more sentences arranged in one or more paragraphs, a signature line, and the like. The message body may also include non-textual content, such as images, videos, hyperlinks, etc. In some cases, e.g., for an email-like message, the message may involve multiple parts (e.g., message body, subject line, recipient field, sender field, attachments, etc.). In other cases, e.g., for a text-like or chat-like message, the message may involve minimal parts (e.g., message body, sender field, time and/or date stamp).

At identify structure operation 604, the message may be identified with a non-hierarchical structure or a hierarchical structure of content. In some aspects, the message may be identified with a hierarchical structure of parts, and a message body part may further include a hierarchical structure of elements. For instance, the message body part may include a hierarchical structure of sentence elements, paragraph elements, bulleted elements, image elements, and the like. In some cases, each element of a message body part may be associated with one or more nested identifiers or other indexing that specifies a level and/or position of each element within the hierarchical structure of the message body part. In other aspects, a message may be identified with a non-hierarchical structure of textual content and/or non-textual content that is indexed by identifiers to positions within a linear or other non-hierarchical structure of content.

For a message having a paragraph structure, textual content of the message body part may be defined by a hierarchical structure of first elements and second elements. That is, first elements may refer to one or more paragraphs and second elements may refer to one or more sentences. In aspects, one or more second elements (e.g., one or more sentences) may fall within each first element (e.g., paragraph), and one or more first elements (e.g., one or more paragraphs) may fall within the message body part (e.g., message body). In some examples, non-textual elements may be interspersed within or among textual elements. For example, an image may be inserted between two paragraphs or within a paragraph of textual content. Additionally or alternatively, an emoji may be inserted with a sentence of textual content, and the like.

At embed extracted content operation 606, content that has been extracted from a file (e.g., attached file or stored file) may be embedded in the message. For example, the extracted content may be an excerpt that may include one or more annotations of an attached file. The extracted content may be associated with information referencing a structure of the attached file from which the content was extracted. That is, the extracted content may be associated with anchor information, including structural information such as computer-readable identifiers specifying a level and/or position within a file structure of the attached file, and contextual information such as user-readable details (e.g., page number, line number, etc.) corresponding to a location in the attached file from which the content was extracted.

Embedding the extracted content may be implemented by any suitable means. For instance, the extracted content may be pasted into the message and, in particular, may be embedded into a message body of the message. As described above, the message body may include textual content, arranged in a hierarchical structure or otherwise, such as a salutation, one or more sentences or paragraphs, and a signature line. The message body may further include non-textual content (e.g., images, videos, hyperlinks, etc.) interspersed within and/or among the textual content.

In aspects, a location within the message body for embedding the extracted content may be determined by any suitable means. In some examples, a sender of the message may select a location for embedding the extracted content. In this case, for example, the sender may place a cursor in a desired location and access a control for embedding the extracted content into the message. For example, in response to accessing the control (e.g., an "Insert" link), a user interface object may be displayed for embedding the extracted content at the desired location. Alternatively, the location for the extracted content may be automatically identified. In some examples, a policy may be employed to identify a location within the message for embedding the extracted content. That is, based on the policy, the extracted content may be embedded following the signature line. Alternatively, based on a policy, the extracted content may be embedded within the message body. e.g., following a first paragraph that follows a salutation, or following the salutation. As should be appreciated, other policies may be implemented for automatically embedding extracted content into a message.

In some instances, more than one file may be attached to a message. In this case, extracted content from multiple attached files may be embedded into the message. Extraction of content may proceed as detailed above for a single attached file. In some aspects, a sender may manually embed the extracted content into the message in a desired order. In other aspects, a policy may be implemented that specifies an order for embedding extracted content for a plurality of attached files. For instance, the policy may be based on the order that files are attached such that extracted content for a first attached file is embedded above extracted content for a second attached file, and so on. Moreover, contextual information including user-readable details displayed with first extracted content and second extracted content may include a file name in addition to location information (e.g., page number, line number, etc.). As should be appreciated, other policies may be implemented for automatically embedding extracted content into a message from a plurality of attached files.

When the extracted content is embedded into the message, the extracted content may be associated with the structure of the message. That is, for a message described by a hierarchical structure of parts and elements, the extracted content may be associated with one or more identifiers specifying a level and/or position of the extracted content within the hierarchical structure of the message. Thus, the extracted content may be associated with a structure associated with the message as well as with a structure associated with the attached file from which the content was extracted.

In further aspects, the extracted content may include one or more links to a file attached to the message. As described above, links may be established between the extracted content and an attached file. In aspects, the links may include computer-readable identifiers or other indexing (e.g., included in anchor information) that connect or couple the extracted content to a structure of the attached file. In aspects, extracted content that includes links to an attached file may be referred to as "active extracted content." In some examples, when a recipient of the message selects the active extracted content, an attached file may automatically open to a location associated with the extracted content. Additionally or alternatively, when a recipient annotates (e.g., by editing or inserting comments) the active extracted content within the message, the annotations may be automatically synchronized with the attached file and/or a corresponding file stored in a files tab of the unified messaging application (e.g., stored file).

At identify recipient endpoint operation 608, one or more endpoints for one or more recipients of the message may be identified. In some cases, one or more endpoints may be identified for each recipient, e.g., a personal computer, a mobile device, a tablet, a smart television, etc. Identifying a recipient endpoint may include identifying a device type for the endpoint (e.g., mobile device, personal computer, tablet computer, etc.), a display type for the endpoint (e.g., monitor, television, touch enabled display, graphical display, alphanumeric display, etc.), a state of the endpoint (e.g., powered on, active, inactive, locked, sleeping, powered off, etc.), applications registered with the endpoint (e.g., enterprise or third party email messaging applications, SMS messaging applications, social networking applications, instant messaging applications, voicemail applications, calendaring applications, etc.), and the like. As should be appreciated, one or more combinations of device type, display type, registered applications, and state may be identified for a recipient endpoint at any given time.

At decision operation 610, it is determined whether an endpoint is registered with a unified messaging application. In aspects, whereas the message may have been received at an endpoint registered with the unified messaging application (e.g., from an accessing user), the message may be transmitted and displayed to recipients on endpoints that are not registered with the unified messaging application. If an endpoint is registered with the unified messaging application, the method proceeds to send operation 614. Alternatively, if an endpoint is not registered with the unified messaging application, the method proceeds to transform operation 612.

At transform operation 612, the message including the extracted content (hereinafter the "content embedded message") is transformed such that it is readable and/or renderable by one or more applications registered with the one or more recipient endpoints. In some aspects, for applications other than the unified messaging application, the content embedded message may be altered (i.e., transformed) such that it can be provided to a team member who is not registered with the unified messaging application. That is, transforming the content embedded message may involve translating the content embedded message into a representation readable by a receiving application and may also include reformatting the content embedded message such that it is renderable by a receiving application registered with the recipient endpoint. Thus, transforming the content embedded message may be described in terms of a translation process (e.g., providing the content embedded message in a language or format readable or understandable by a consuming application) and a reformatting process (e.g., providing the content embedded message in a form such that it may be rendered or presented by a consuming application or by a particular endpoint). In some aspects, the transform operation may involve a single process that transforms the content embedded message into a language or format readable by a receiving application, where the receiving application performs any processing necessary for rendering or presenting the content embedded message on a particular recipient endpoint.

In some aspects, the content embedded message may be transformed differently for different applications registered with different endpoints. For instance, the content embedded message may be transformed based on one or more factors associated with an identified endpoint, including a device type, display type, registered applications, etc. In some cases, the message may be transformed for email messaging applications, e.g., third party email messaging applications and enterprise messaging applications, but not for other applications registered with an endpoint, e.g., instant messaging applications, SMS applications, and the like.

In aspects, as described above, the extracted content is anchored to the structure of the message by one or more identifiers that specify a location of the extracted content within the structure of the message. Additionally, the extracted content references anchor information specifying a location within an associated file (e.g., attached file and/or stored file) from which the content was extracted, e.g., computer-readable identifiers specifying a level and/or position within a file structure of the associated file from which the content was extracted. In some cases, the anchor information further includes user-readable details (e.g., page number, line number, etc.) corresponding to a location in the associated file from which the content was extracted.

During transformation, the content embedded message may be reformatted into different structures renderable by different receiving applications, e.g., a first structure renderable by a third party email messaging application and a second structure renderable by an enterprise messaging application. For example, some parts and/or elements of the message received by the unified messaging application may not be renderable by a particular receiving application and may be removed. Additionally, the content embedded message may be translated into different representations readable by different messaging applications, e.g., a first representation readable by a third party email messaging application and a second representation readable by an enterprise messaging application.

In aspects, computer-readable and/or user-readable anchoring information referencing the associated file (e.g., attached file and/or stored file) may be transformed along with the content embedded message. As described above, the extracted content included in the message may be active extracted content, which includes links that couple the extracted content to the file structure of an associated file (e.g., attached file and/or stored file). In this case, the links between the active extracted content and the associated file may also be translated into a representation readable by a receiving application. In a first example, the links between the active extracted content and an attached file may be translated such that in response to accessing the active extracted content, a recipient is able to access the attached file (e.g., the attached file may be automatically opened to the location of the extracted content). In a second example, e.g., where the associated file is stored in a files tab of the unified messaging platform (e.g., stored file), and an enterprise messaging application has access to the stored file, the links may be translated into hyperlinks referencing corresponding positions within a file structure of the stored file.

In some cases, a third party email messaging application may be unable to process the content embedded message. For instance, a third party email messaging application may be unable to process a hierarchical structure for a message. In this case, a hierarchical structure for the content embedded message may be flattened such that it is represented by a linear structure. Alternatively, a third party messaging application may be unable to process active extracted content including links to an associated file (e.g., attached file and/or a stored file). In this case, the extracted content may be translated into an electronic image (e.g., portable document format, .jpeg, etc.) or other inactive content, representative of the extracted content.

Furthermore, transform operation 612 may consider additional factors, such as a device type and display type, when transforming the content embedded message. For instance, transform operation may include reformatting the content embedded message such that it is renderable by a particular device type having a particular display type. For instance, while a personal computer may be capable of rendering the content embedded message, a mobile device may not have such capability. In this case, the content embedded message, or merely the extracted content, may be transformed into an electronic image (e.g., .jpeg) for rendering by the mobile device.

At send operation 614, the content embedded message is sent to one or more recipient endpoints. In some aspects, e.g., when the one or more recipient endpoints are registered with the unified messaging application, the content embedded message may not require transformation. That is, as described above, the content embedded message may be presented within a conversation in a center pane of a user interface of the unified messaging platform. In further aspects, user-readable contextual details (e.g., page number, line number, paragraph number, etc.) may be displayed with the extracted content to notify recipients of a location within the file from which the content was extracted. Moreover, the file may be represented as a single synchronized version that is linked to the extracted content (e.g., accessed through the message body), the attached file (e.g., accessed by opening the attached file), and the corresponding stored file (e.g., accessed via the files tab), such that any annotations made at any access point to the file is automatically synchronized across all access points as a single version of the file.

Alternatively, when a recipient endpoint is not registered with the unified messaging application, send operation 614 may send the content embedded message to a receiving application outside of the unified messaging platform, such as a third party email messaging application or an enterprise messaging application. The receiving application may then render or present a copy of the content embedded message to a user at the recipient endpoint. The receiving application may further display user-readable contextual details (e.g., page number, line number, paragraph number, etc.) with the extracted content to notify recipients of a location within the file from which the content was extracted. In this case, when a recipient endpoint is not registered with the unified messaging application, while the extracted content may be linked to an attached file and while the user may benefit from receiving a copy of the content embedded message, the user may not be able to interact with a single synchronized version of the attached file. In other examples, e.g., where an enterprise messaging application has access to a stored version of the file, the user may be able to interact with a single synchronized version of the file.

As should be appreciated, operations 602-614 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 7:
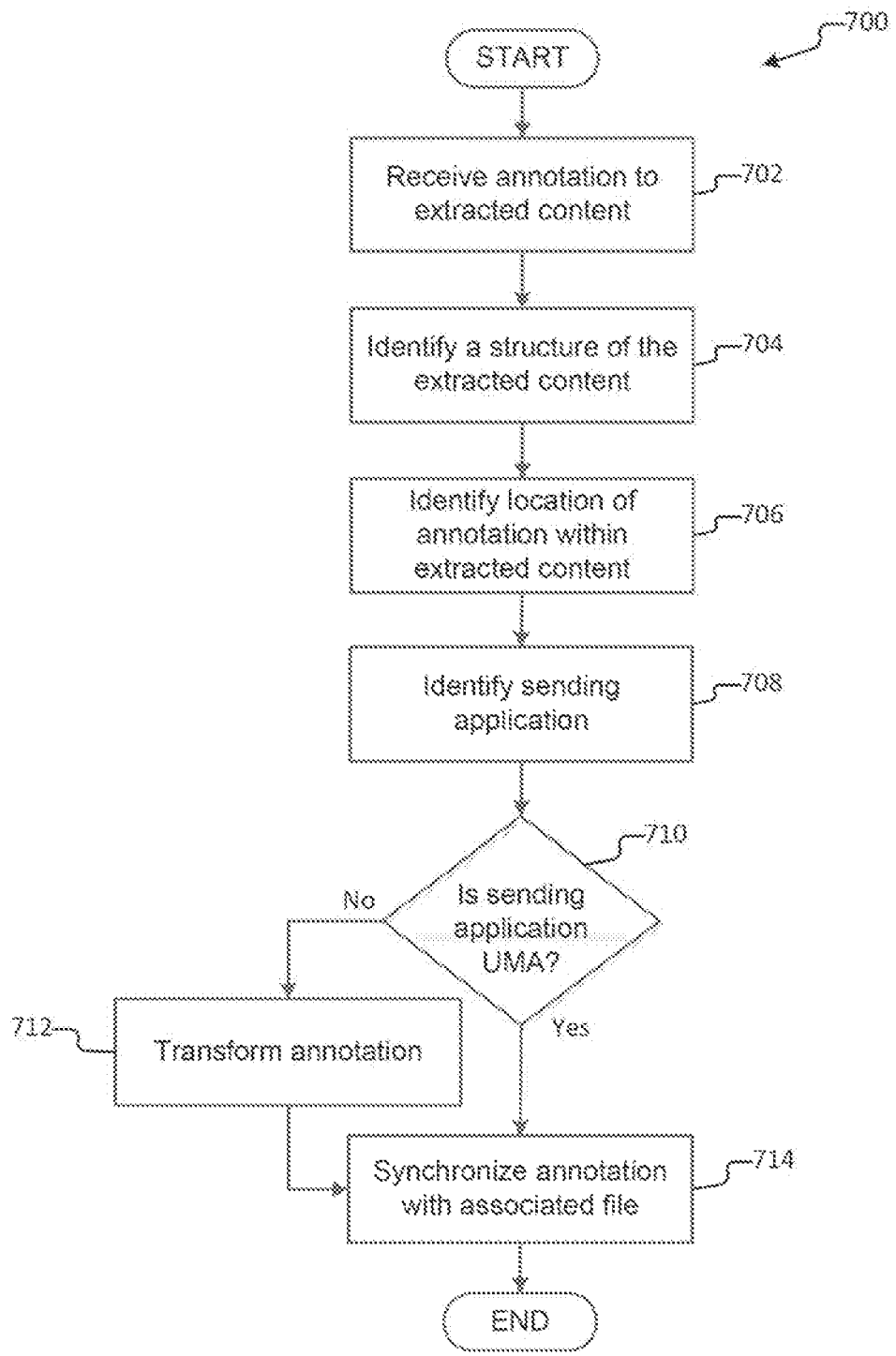
FIG. 7 illustrates an exemplary method for synchronize an annotation made to extracted content with an associated file, according to an example embodiment.

FIG. 7 illustrates an exemplary method for synchronize an annotation made to extracted content with an associated file, according to an example embodiment.

At receive annotation operation 702, an annotation to extracted content is received. Extracted content is a representation of at least a portion of an associated file. The associated file may be attached to a message (e.g., attached file) and/or may be a file stored within a files tab of a unified messaging platform (e.g., stored file) that is accessible to one or more other applications. An annotation refers to an edit (e.g., addition and/or deletion) and/or a comment appended to the extracted content. An annotation may be received when a user at a second endpoint registered with one or more of the unified messaging application, an enterprise messaging application, a third party email messaging application, an SMS messaging application, an instant messaging application, and the like, selects the extracted content and inserts the annotation. In other cases, an annotation may be received when an accessing user at a first endpoint registered with the unified messaging application selects the extracted content and inserts the annotation.

At identify structure operation 704, structural information associated with the extracted content may be identified. As detailed above, anchor information associated with the extracted content may include structural information such as computer-readable identifiers specifying a level and/or position within a file structure of an associated file from which the content was extracted. As detailed above, the anchor information may be stored with the extracted content, for example, in the form of computer-readable metadata. The structural information associated with the extracted content may be identified by any suitable means, e.g., by scanning the computer-readable metadata associated with the extracted content.

At identify location operation 706, a location for the received annotation to the extracted content may be identified. In this case, the location for the received annotation may be identified within a structure of the extracted content, which may be associated with a file structure of an associated file. For instance, extracted content may be associated with second to tenth sentence elements of a third paragraph element of a second section element within the file structure of an associated file. In this case, the extracted content displayed in a message may include the second to tenth sentences of a third paragraph of a second section of an associated file. Based on this example, an annotation may be received to an eighth sentence of the third paragraph of the second section that is displayed in the message. Thus, in this example, the annotation may be located within the associated file structure at an eighth sentence element of a third paragraph element of a second section element and may be referenced by one or more identifiers specifying the level and position of this location within the associated file structure. As should be appreciated, other methods for referencing a location within an associated file structure for the received annotation are possible and may be implemented without departing from the present disclosure.

At identify application operation 708, a sending application associated with the received annotation may be identified. For instance, a sending application may include the unified messaging application, an enterprise messaging application, a third party email messaging application, and the like. For example, as detailed above, an annotation may be received when a user at a second endpoint registered with one or more of the unified messaging application, an enterprise messaging application, a third party email messaging application, and the like, selects the extracted content and inserts the annotation.

At decision operation 710, it is determined whether the sending application is the unified messaging application. If the sending application is the unified messaging application, the method proceeds to synchronize operation 714. Alternatively, if the sending application is not the unified messaging application, the method proceeds to transform operation 712.

At transform operation 712, the annotation is transformed such that it is readable by the unified messaging application. As detailed above, an annotation may be received at a location within the extracted content. The location of the received annotation may be identified within a structure of the extracted content, and the extracted content may be associated with a location within a file structure of an associated file. Accordingly, the received annotation may be mapped to a location within the file structure of an associated file. In this case, transform operation 712 may transform the annotation (e.g., addition, deletion, or comment) as well as location information associated with the annotation into a format and/or representation readable by the unified messaging application. That is, the annotation may be transformed into computer-readable instructions for applying the annotation to the associated file in the unified messaging platform.

At synchronize operation 714, the received annotation may be synchronized with an associated file. In aspects, if the sending application is the unified messaging application, in response to receiving an annotation to extracted content within a message, computer-readable instructions for applying the annotation to the associated file may be generated and the received annotation may be automatically applied to the associated file (e.g., attached file and/or stored file). In aspects, the computer-readable instructions may comprise an indication of the annotation (e.g., addition, deletion, comment) and one or more identifiers mapping the received annotation to level and/or position within a file structure of the associated file. The computer-readable instructions may be implemented to apply the received annotation to the location within the associated file. In at least some aspects, a single version of the associated file provided by the unified messaging platform reflects annotations made via any access point to the associated file, e.g., via extracted content, via opening an attached file, via opening a file stored in a files tab of the unified messaging application.

In other aspects, if the sending application is not the unified messaging application, a received annotation made to extracted content may by transformed to generate computer-readable instructions readable by the unified messaging application. The computer-readable instructions may comprise an indication of the annotation (e.g., addition, deletion, comment) and one or more identifiers mapping the received annotation to level and/or position within a file structure of the associated file. The computer-readable instructions may be implemented to apply the received annotation to the location within the associated file. In at least some aspects, a single version of the associated file provided by the unified messaging platform reflects annotations made via any access point to the associated file, whether via an internal or an external endpoint, e.g., via extracted content, via opening an attached file, via opening a file stored in a files tab of the unified messaging application.

As should be appreciated, operations 702-714 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 8:
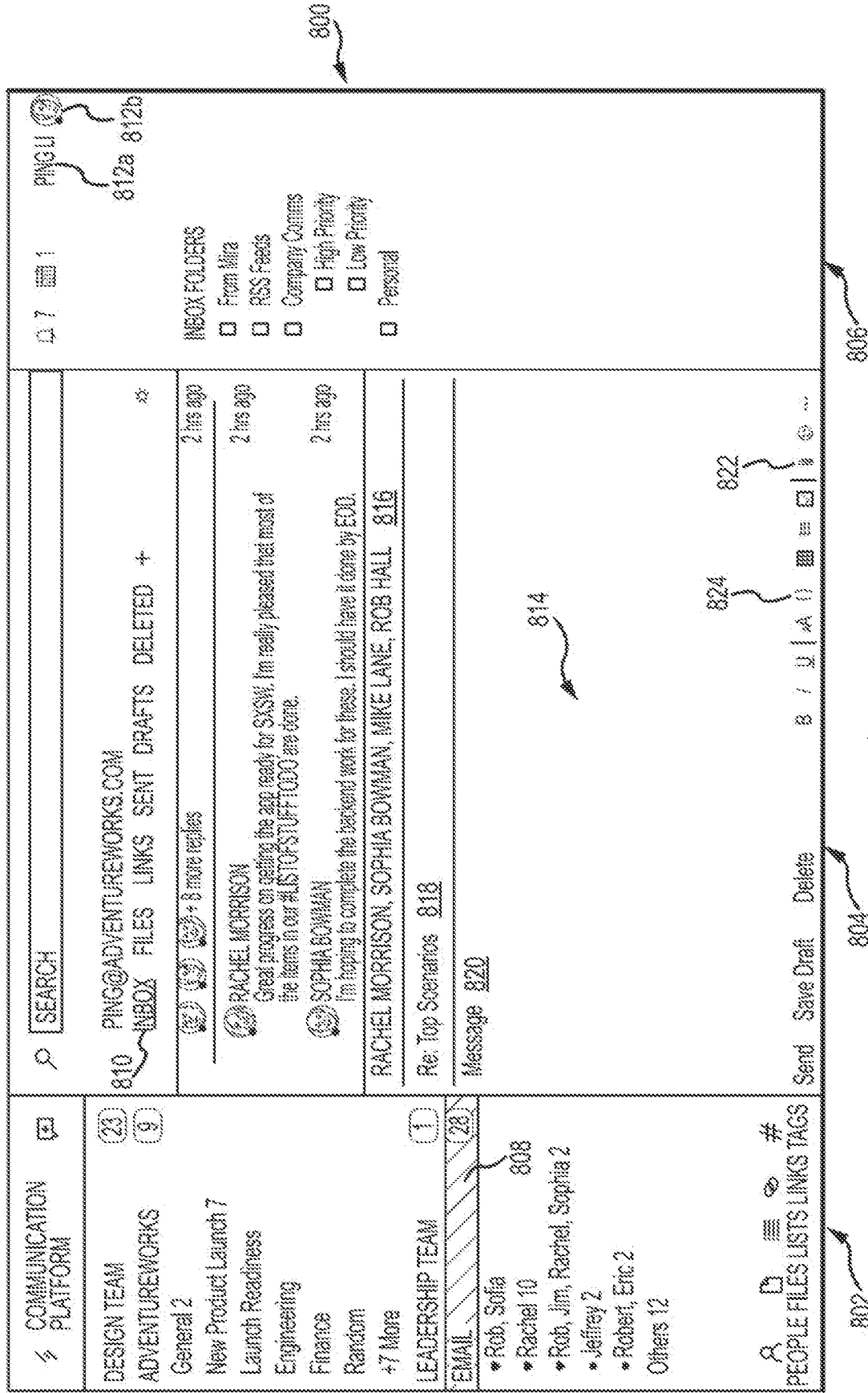
FIG. 8 illustrates an exemplary interface for embedding extracted content in a message, according to an example embodiment.

FIG. 8 illustrates an exemplary interface for embedding extracted content in a message, according to an example embodiment.

As described above, the unified messaging platform may provide a user interface 800 including three panes, e.g., a left rail 802, a center pane 804, and a right rail 806. In aspects, as described above, in response to selecting an email portal (e.g., email portal 808) in the left rail 802, the communications associated with an email inbox 810 may be displayed in center pane 804. As illustrated by FIG. 8, a particular user accessing the unified messaging application (e.g., Ping Li) is identified by user name 812a and user icon 812b.

As illustrated by FIG. 8, the unified messaging platform may provide an email interface object, e.g., email interface object 814, to send "email-like" communications. In aspects, email interface object 814 may provide a recipient field 816 for inputting or selecting recipients, and a subject field 818 for inputting a subject line. Moreover, email interface object 814 may provide an input field 820 for entry of text, entry of commands, entry of hashtags, etc. Email interface object 814 may further provide additional controls, such as attach control 822 and embed control 824.

In aspects, a file may be attached to an email message by selecting attach control 822 and selecting and inserting a file upon browsing. Additionally or alternatively, a file may be attached by copying and pasting the file to the message. In some aspects, in response to attaching a file to the message, the file may be scanned for annotations. If the attached file includes one or more annotations, at least a portion of the attached file may be automatically extracted and embedding in the message, as described above. Alternatively, a user may select an embed control 824 to extract at least a portion of an associated file, e.g., an attached file or a file stored in a files tab of a unified messaging application, and embedding the portion of the associated file in the message, as described above. In response to inputting a message into an email interface object 814 and hitting enter, a communication from the user may automatically post to a conversation as a new "email-like" message.

As should be appreciated, the various features and functionalities of user interface 800 described with respect to FIG. 8 are not intended to limit associated systems and methods to the particular features and functionalities described. Accordingly, additional features and functionalities may be associated with the systems and methods described herein and/or some features and functionalities described may be excluded without departing from the systems and methods described herein.

Figure 9A:
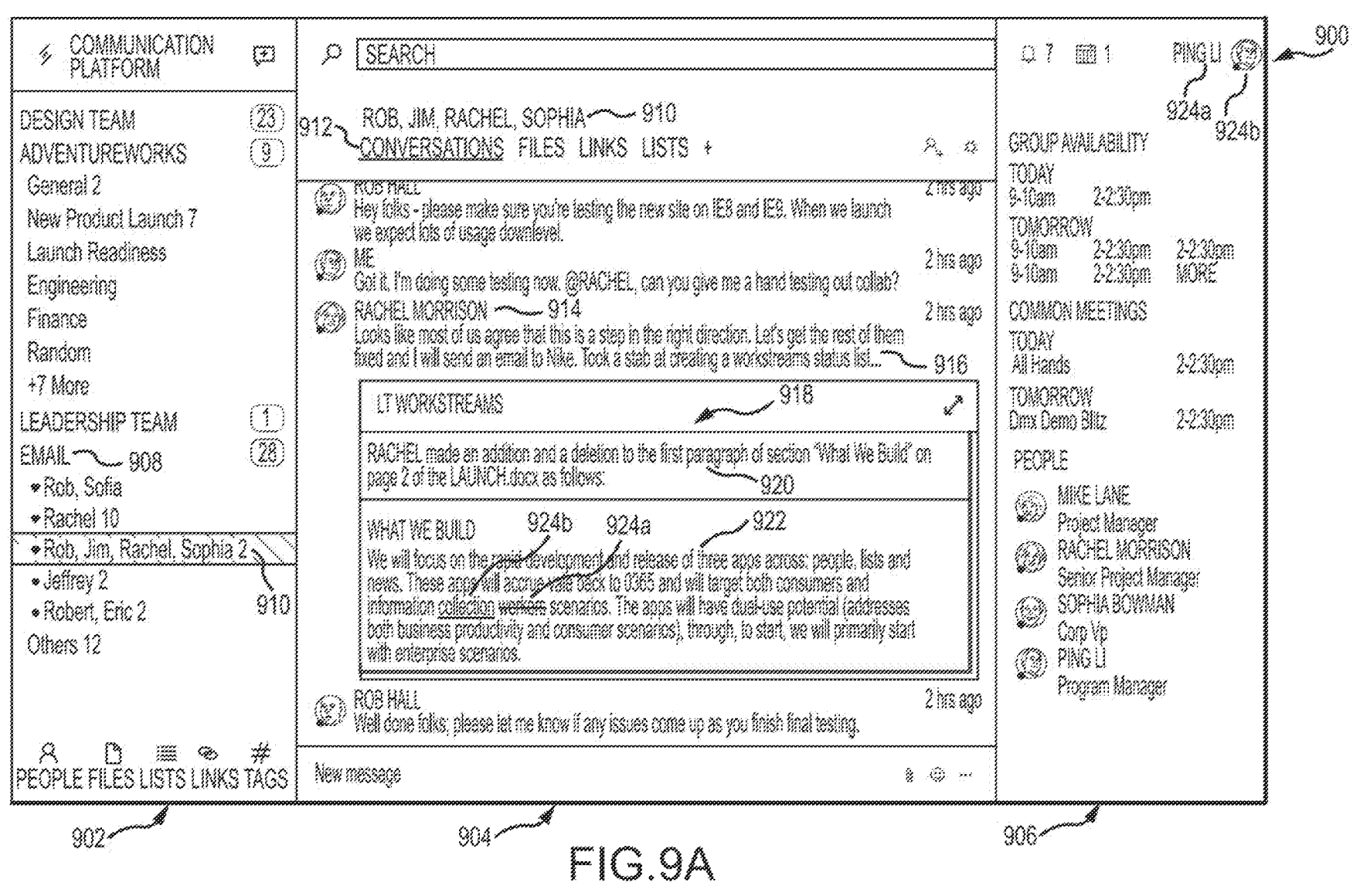

FIG. 9A illustrates an exemplary interface for displaying a content embedded message, according to an example embodiment.

As described above, the unified messaging platform may provide a user interface 900 including three panes, e.g., a left rail 902, a center pane 904, and a right rail 906. In aspects, as described above, in response to selecting a conversation 910 within an email portal 908 in the left rail 902, the conversation 910 may be displayed in a conversations tab 912 in center pane 904. As illustrated by FIG. 9A, a particular user accessing the unified messaging application (e.g., Ping Li) is identified by user name 924a and user icon 924b.

As illustrated by FIG. 9A, a communication 914 was received from Rachel Morrison. The communication 914 includes textual content 916 followed by an embedded object 918. The embedded object 918 includes context information 920 about extracted content 922. For example, the context information 920 provides a description of annotation 924a (e.g., deletion) and annotation 924b (e.g., addition), a location of the extracted content in an associated file (e.g., first paragraph of a section entitled "What We Build," page 2), and further includes a file name (e.g., "LAUNCH-.docx").

In additional or alternative examples, extracted content (e.g., annotations 924a and 924b within extracted content 922) can be interleaved with other messages and/or comments within a conversation based on a date or time (not shown). For example, a first comment regarding a word document may be made on a first date or time within a conversation (e.g., displayed in conversations tab 912). Additionally, a second comment may be made within the word processing document on a second date or time. The second comment with anchor content can be extracted from the word processing document and presented within the conversation based on the second date or time. Thereafter, a third comment regarding the word processing document (and/or the second comment with the anchor content) may be made on a third date or time within the conversation. Thus, the comments with anchor content may be interleaved with comments made in a message within a conversation based on a date and/or time of receipt.

Figure 9B:
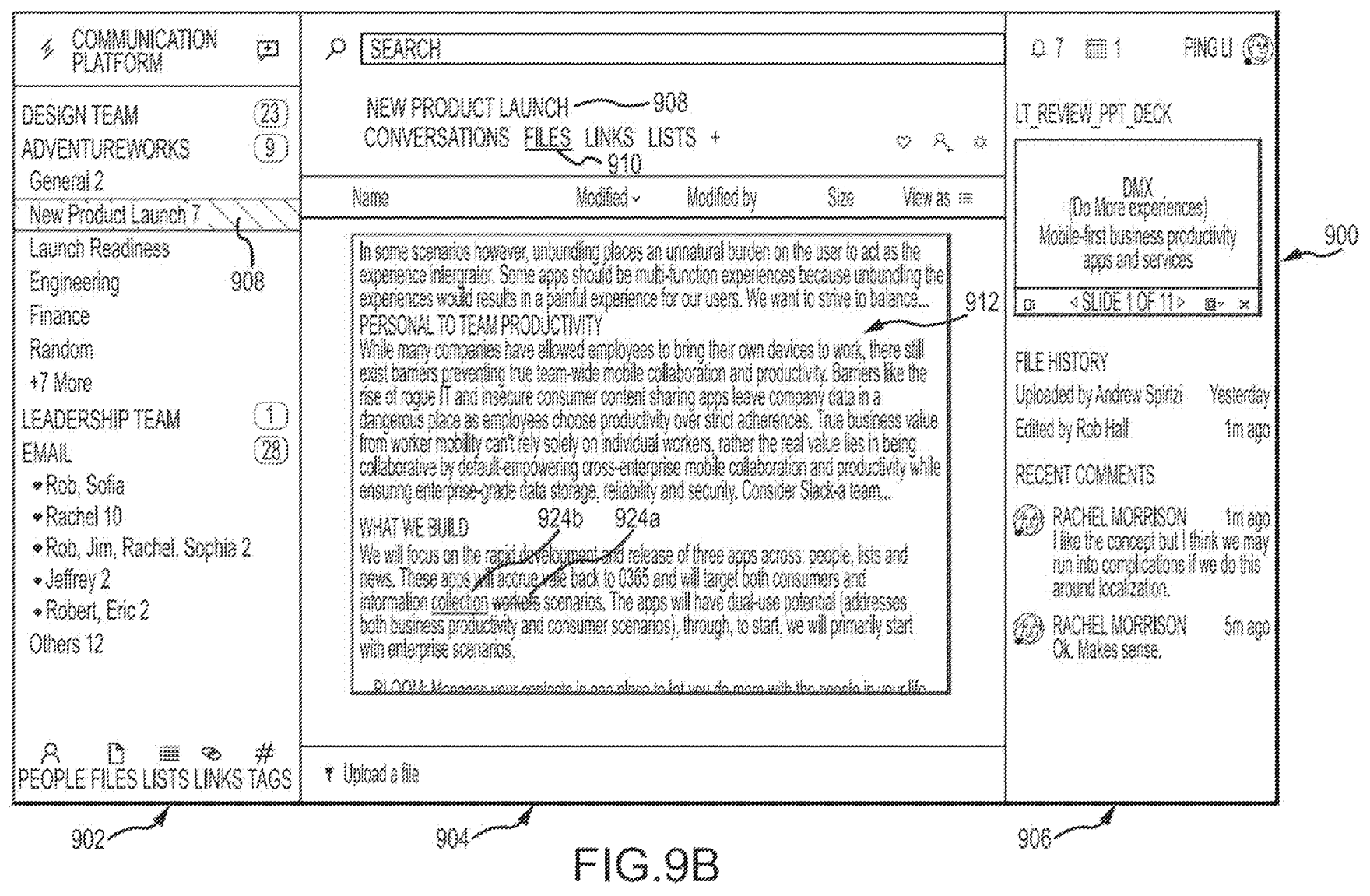

FIG. 9B illustrates an exemplary interface for displaying an associated file in response to selection of embedded content, according to an example embodiment.

As described above, the unified messaging platform may provide a user interface 900 including three panes, e.g., a left rail 902, a center pane 904, and a right rail 906. In aspects, as described above, files associated with a category 908 may be displayed in a files tab 910 in center pane 904. In aspects, in response to selecting extracted content presented in a content embedded communication (e.g., communication 914, illustrated by FIG. 9A), an associated file 912 may be opened in the files tab 910. As illustrated by FIG. 9B, at least a portion of an associated file 912 is displayed in center pane 904. Moreover, the associated file may be opened to a location of one or more annotations included in the extracted content, e.g., annotation 924a (e.g., deletion) and annotation 924b (e.g., addition), shown in FIG. 9A.

As should be appreciated, the various features and functionalities of user interface 900 described with respect to FIGS. 9A and 9B are not intended to limit associated systems and methods to the particular features and functionalities described. Accordingly, additional features and functionalities may be associated with the systems and methods described herein and/or some features and functionalities described may be excluded without departing from the systems and methods described herein.

Figure 10:
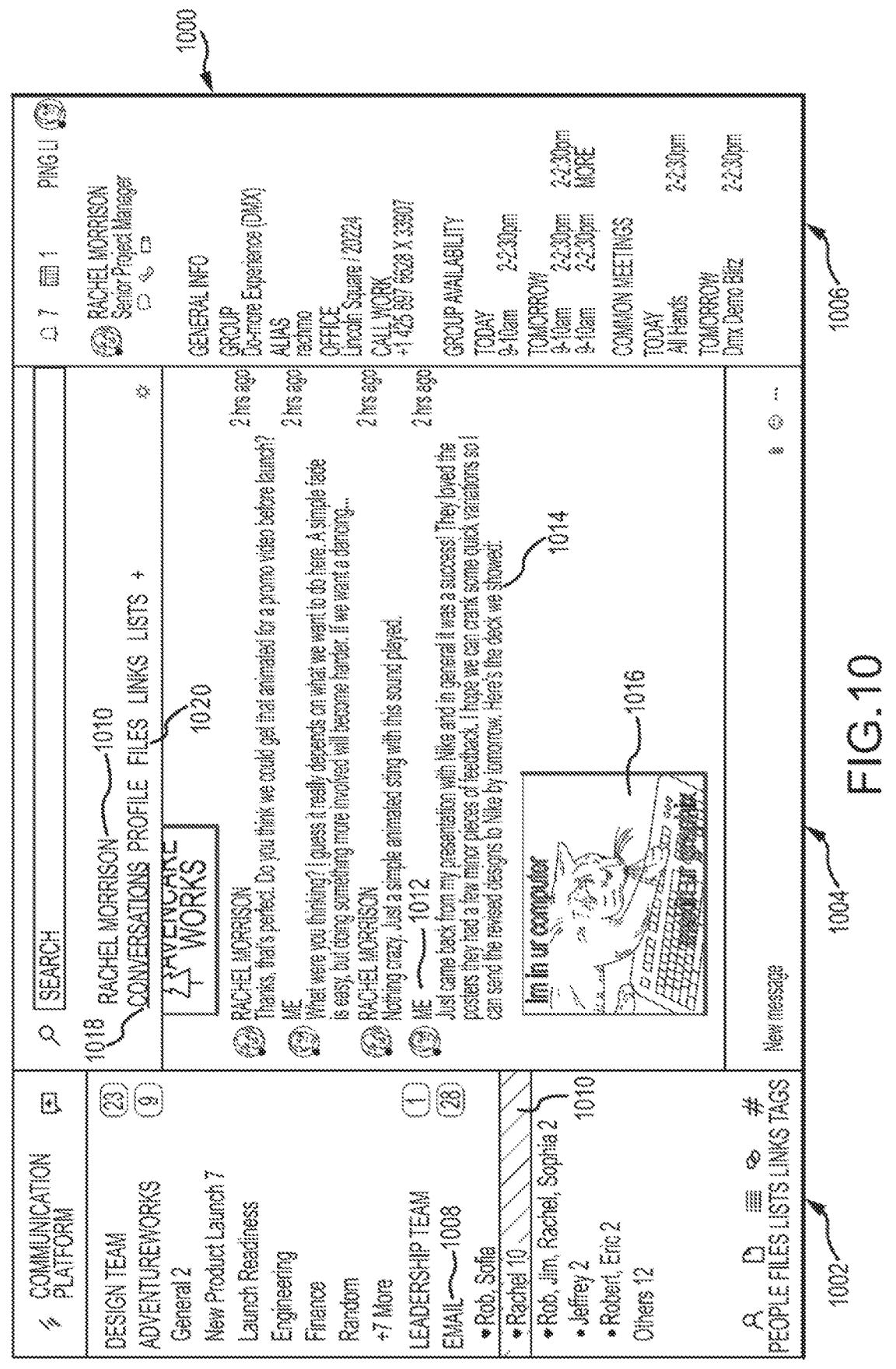

FIG. 10 illustrates an exemplary interface for embedding extracted content in a message, according to an example embodiment.

As described above, the unified messaging platform may provide a user interface 1000 including three panes, e.g., a left rail 1002, a center pane 1004, and a right rail 1006. In aspects, as described above, in response to selecting conversation 1010 in an email portal (e.g., email portal 1008) in the left rail 1002, the conversation 1010 may be displayed in conversation tab 1018 of center pane 1004.

As illustrated by FIG. 10, a communication 1012 was received from Me (e.g., the accessing user). The communication 1012 includes textual content 1014 followed by an extracted content 1016. In this case, extracted content 1016 is an image. As detailed above, the extracted content 1016 may include a substantial portion of the content of an associated file (e.g., image). In some aspects, in response to selecting extracted content 1016, an image stored in a files tab (e.g., files tab 1020) may be opened in center pane 1004.

As should be appreciated, the various features and functionalities of user interface 1000 described with respect to FIG. 10 are not intended to limit associated systems and methods to the particular features and functionalities described. Accordingly, additional features and functionalities may be associated with the systems and methods described herein and/or some features and functionalities described may be excluded without departing from the systems and methods described herein.

Figure 11:
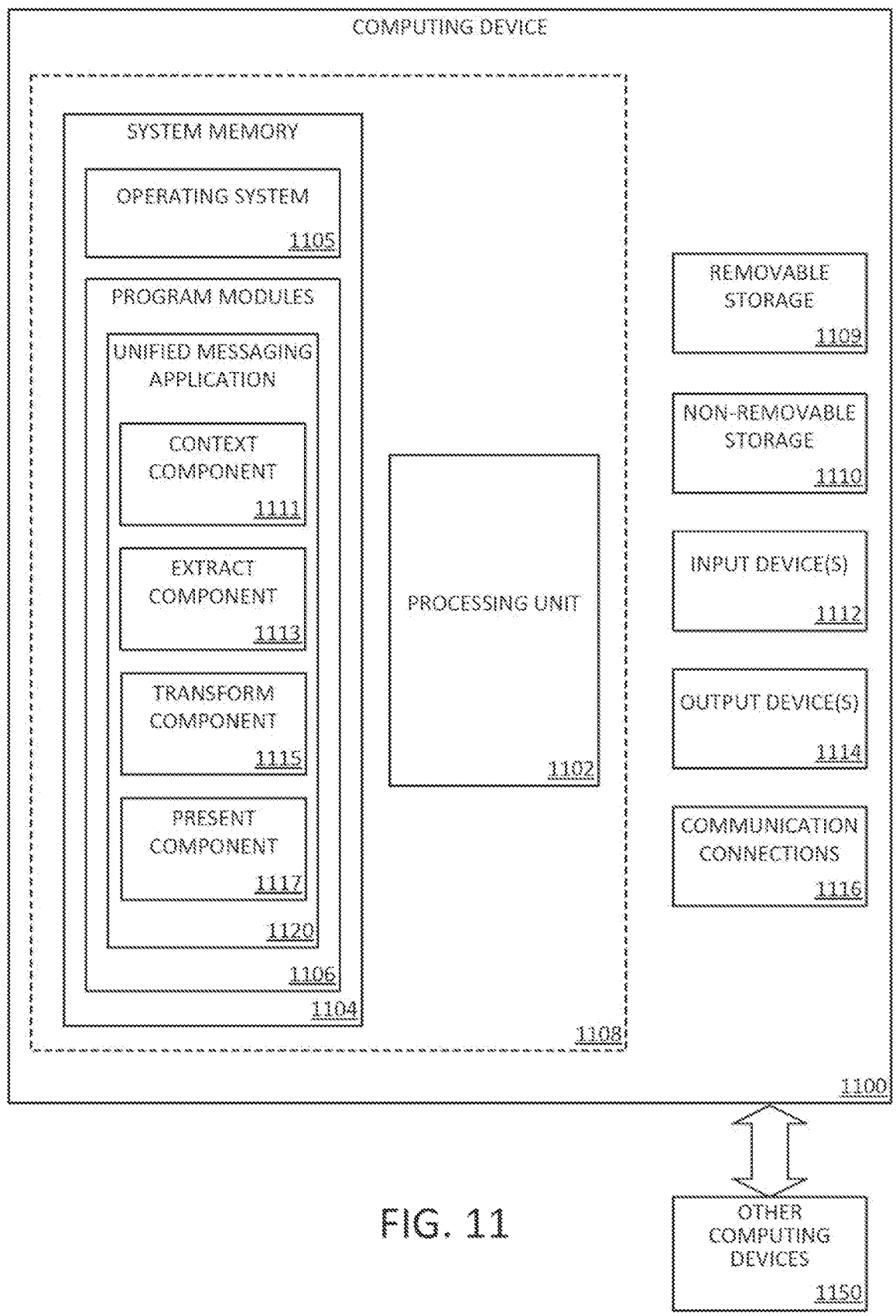
FIG. 11 is a block diagram illustrating example physical components of a computing device with which aspects of the disclosure may be practiced.

FIGS. 11-14 and the associated descriptions provide a discussion of a variety of operating environments in which aspects of the disclosure may be practiced. However, the devices and systems illustrated and discussed with respect to FIGS. 11-14 are for purposes of example and illustration and are not limiting of a vast number of computing device configurations that may be utilized for practicing aspects of the disclosure, described herein FIG. 11 is a block diagram illustrating physical components (e.g., hardware) of a computing device 1100 with which aspects of the disclosure may be practiced. The computing device components described below may have computer executable instructions for implementing a unified messaging application on a server computing device 106 (or server computing device 308), including computer executable instructions for unified messaging application 1120 that can be executed to employ the methods disclosed herein. In a basic configuration, the computing device 1100 may include at least one processing unit 1102 and a system memory 1104. Depending on the configuration and type of computing device, the system memory 1104 may comprise, but is not limited to, volatile storage (e.g., random access memory)), non-volatile storage (e.g., read-only memory), flash memory, or any combination of such memories. The system memory 1104 may include an operating system 1105 and one or more program modules 1106 suitable for running unified messaging application 1120, such as one or more components in regards to FIG. 3 and, in particular, context component 1111, extract component 1113, transform component 1115, or present component 111 7. The operating system 1105, for example, may be suitable for controlling the operation of the computing device 1100. Furthermore, embodiments of the disclosure may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 102, the program modules 1106 (e.g., unified messaging application 1120) may perform processes including, but not limited to, the aspects, as described herein. Other program modules that may be used in accordance with aspects of the present disclosure, and in particular for providing a unified messaging platform, may include context component 1111, extract component 1113, transform component 1115, or present component 1117, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1100 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1100 may also have one or more input device(s) 1112 such as a keyboard, a mouse, a pen, a sound or voice input device, a touch or swipe input device, etc. The output device(s) 1114 such as a display, speakers, a printer, etc. may also be included. The aforementioned devices are examples and others may be used. The computing device 1100 may include one or more communication connections 1116 allowing communications with other computing devices 1150. Examples of suitable communication connections 1116 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 12A:
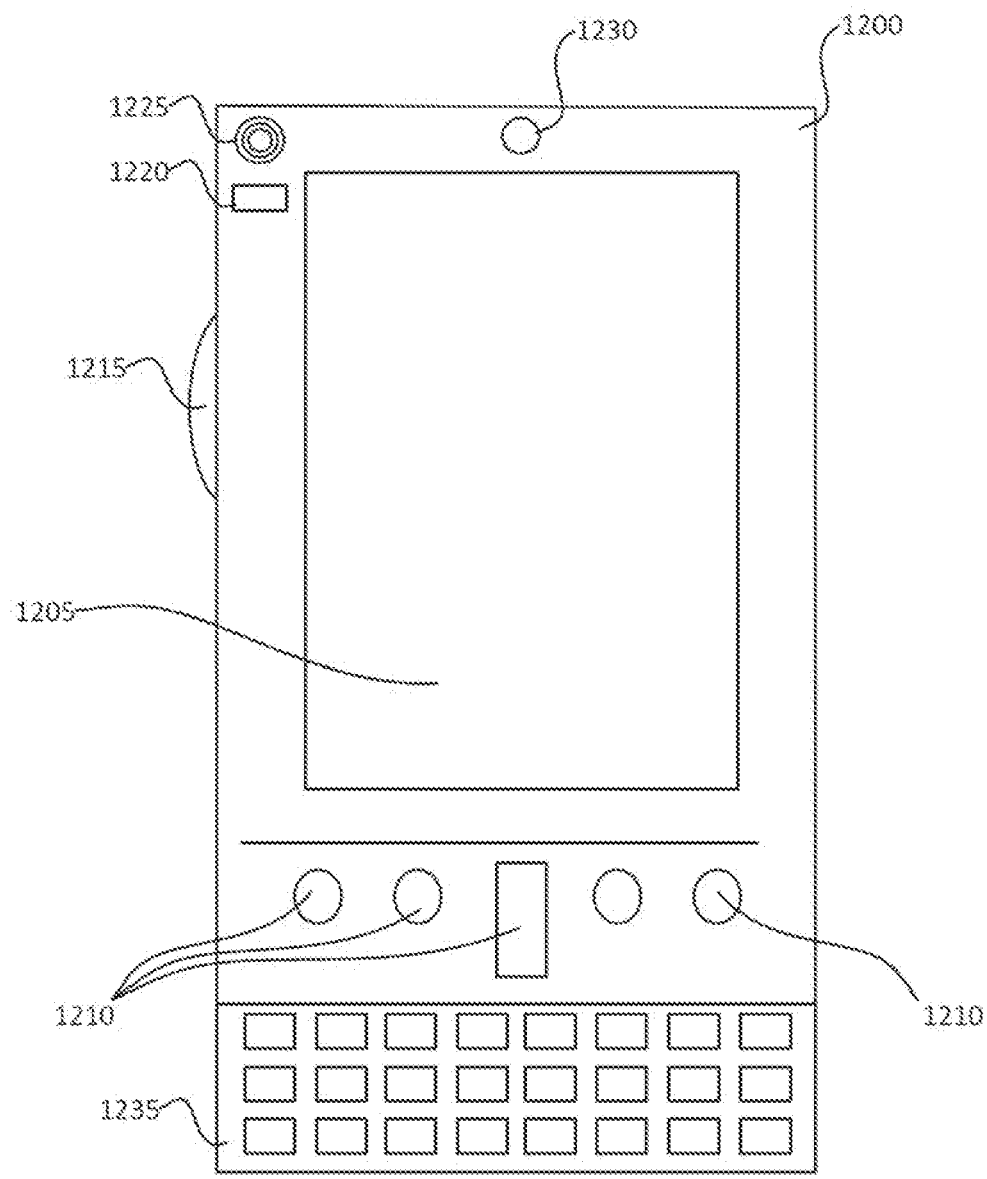
FIGS. 12A and 12B are simplified block diagrams of a mobile computing device with which aspects of the present disclosure may be practiced.
Figure 12B:
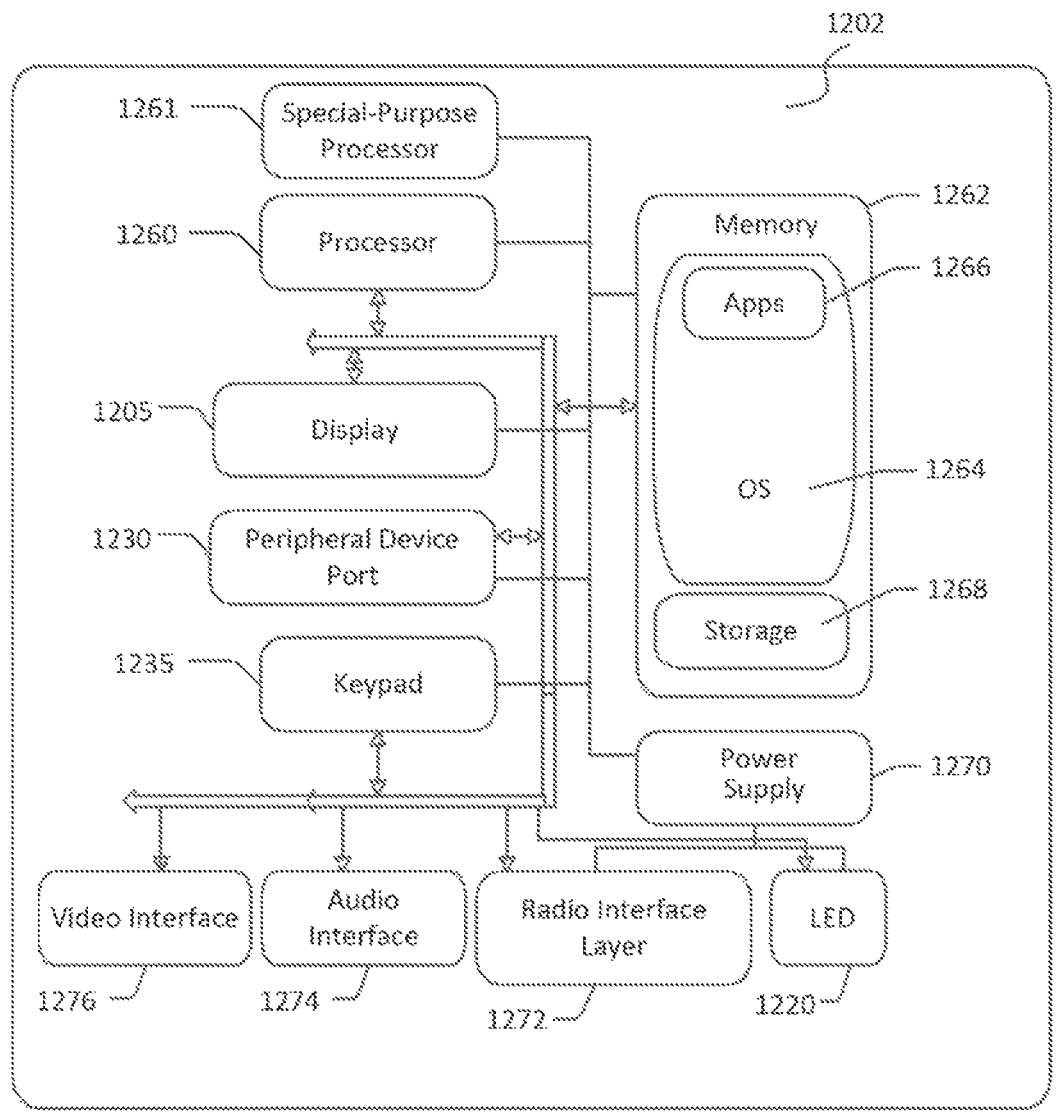

FIGS. 12A and 12B illustrate a mobile computing device 1200, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 12A, one aspect of a mobile computing device 1200 for implementing the aspects is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative aspects, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some aspects, the mobile computing device 1200 incorporates a vibration transducer for providing the user with tactile feedback. In yet another aspect, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one aspect of a mobile computing device. That is, the mobile computing device 1200 can incorporate a system (e.g., an architecture) 1202 to implement some aspects. In one embodiment, the system 1202 is implemented as a "smart phone" capable of running one or more applications (e.g., browser, e-mail, calendaring, contact managers, messaging clients, games, and media clients/players). In some aspects, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the instructions for providing a unified messaging platform as described herein (e.g., search engine, extractor module, relevancy ranking module, answer scoring module, etc.).

The system 1202 has a power supply 1270, which may be implemented as one or more batteries. The power supply 1270 might further include an external power source, such as an AC adapter or a powered docking cradle that supplements or recharges the batteries.

The system 1202 may also include a radio interface layer 1272 that performs the function of transmitting and receiving radio frequency communications. The radio interface layer 1272 facilitates wireless connectivity between the system 1202 and the "outside world," via a communications carrier or service provider. Transmissions to and from the radio interface layer 1272 are conducted under control of the operating system 1264. In other words, communications received by the radio interface layer 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present disclosure, the microphone may also serve as an audio sensor to facilitate control of notifications, as will be described below. The system 1202 may further include a video interface 1276 that enables an operation of an on-board camera 1230 to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 12B by the non-volatile storage area 1268.

Data/information generated or captured by the mobile computing device 1200 and stored via the system 1202 may be stored locally on the mobile computing device 1200, as described above, or the data may be stored on any number of storage media that may be accessed by the device via the radio interface layer 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio interface layer 1272 or via a distributed computing network. Similarly, such data/information may be readily transferred between computing devices for storage and use according to well-known data/information transfer and storage means, including electronic mail and collaborative data/information sharing systems.

Figure 13:
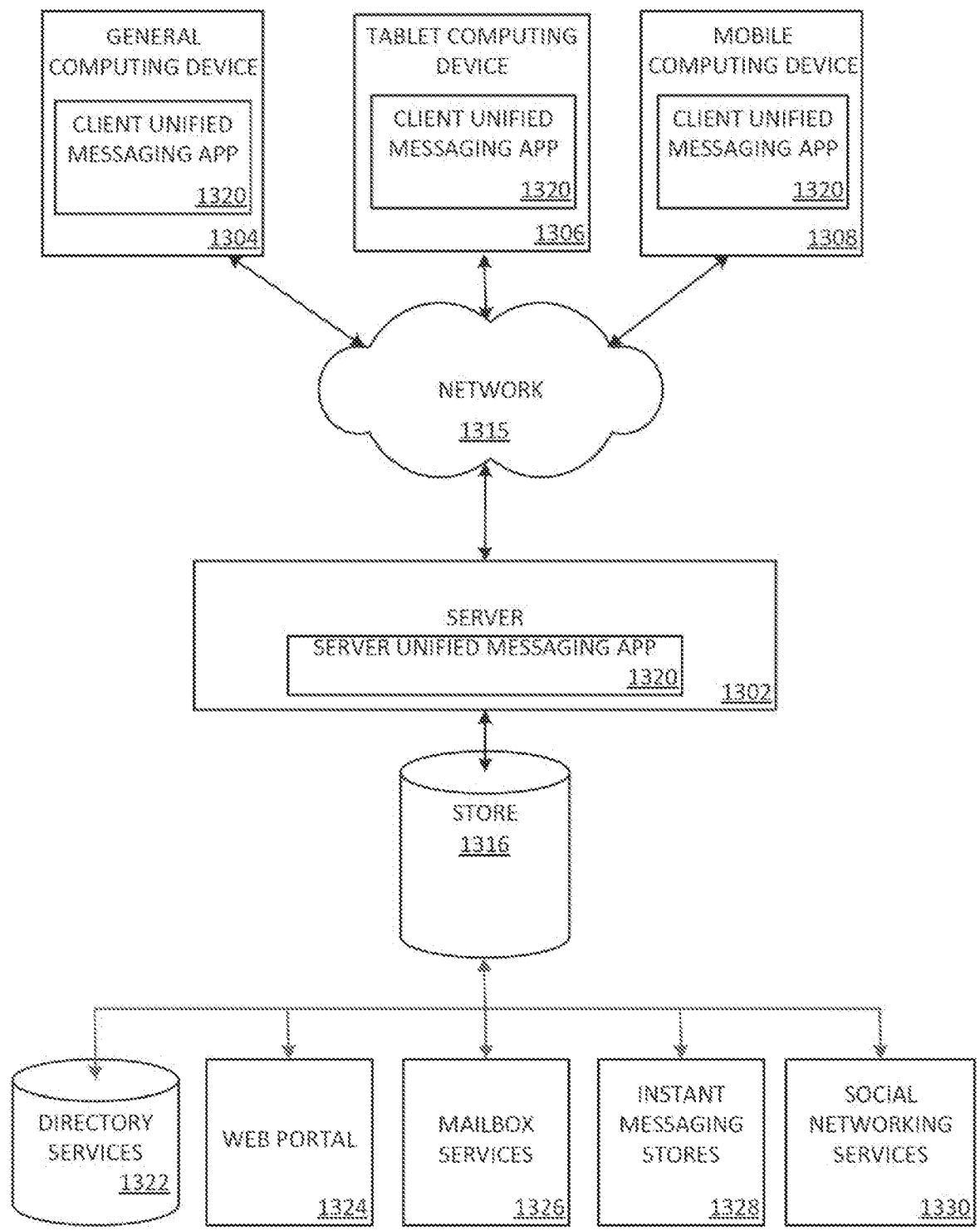
FIG. 13 is a simplified block diagram of a distributed computing system in which aspects of the present disclosure may be practiced.

FIG. 13 illustrates one aspect of the architecture of a system for processing data received at a computing system from a remote source, such as a personal computer 1304, tablet computing device 1306, or mobile computing device 1308, as described above. Content displayed at server device 1302 may be stored in different communication channels or other storage types. For example, various documents may be stored using a directory service 1322, a web portal 1324, a mailbox service 1326, an instant messaging store 1328, or a social networking site 1330. The unified messaging application 1320 may be employed by a client that communicates with server device 1302, and/or the unified messaging application 1320 may be employed by server device 1302. The server device 1302 may provide data to and from a client computing device such as a personal computer 1304, a tablet computing device 1306 and/or a mobile computing device 1308 (e.g., a smart phone) through a network 1315. By way of example, the computer system described above with respect to FIGS. 1-12 may be embodied in a personal computer 1304, a tablet computing device 1306 and/or a mobile computing device 1308 (e.g., a smart phone). Any of these embodiments of the computing devices may obtain content from the store 1316, in addition to receiving graphical data useable to be either pre-processed at a graphic-originating system, or post-processed at a receiving computing system.

Figure 14:
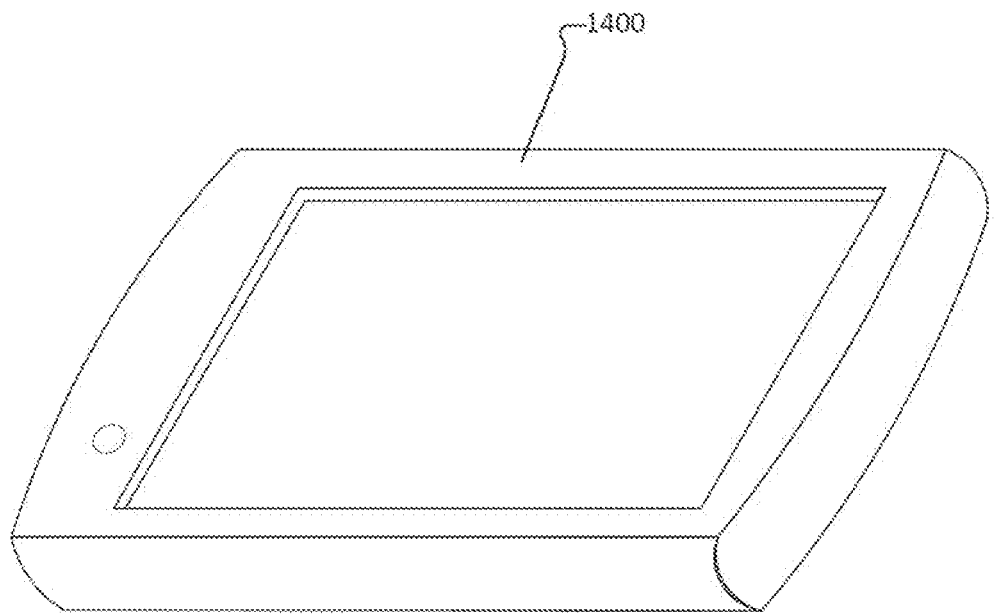
FIG. 14 illustrates a tablet computing device for executing one or more aspects of the present disclosure.

FIG. 14 illustrates an exemplary tablet computing device 1400 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for providing attachments of data files in online communication sessions between a plurality of participants, the method comprising:
   causing display of a first user interface at a first client device of a first participant of a communication session, the first user interface comprising a message input field defined within the first user interface for receiving input to compose messages for transmission in the communication session;
   causing display of a second user interface at a second client device of a second participant of the communication session, the second user interface comprising a region defined for displaying messages within the second user interface previously transmitted by participants of the communication session;
   receiving selection of a data file at the first client device;
   causing display of at least a first excerpt of the data file editable within the message input field of the first user interface;
   receiving an edit to the data file through the message input field of the first user interface;
   incorporating the edit to the data file at a stored location of the data file;
   receiving textual input through the message input field of the first user interface causing display of text within the message input field;
   transmitting the edited data file and the text to the second client device; and
   causing display of the text and a second excerpt of the edited data file within the region defined for displaying messages of the second user interface;
   receiving selection of the second excerpt within the region; and
   causing display of the edited data file within the region in response to receiving the selection of the second excerpt, the edited data file opened to a position corresponding to the position of the second excerpt within the edited data file.

2. The method of claim 1, wherein receiving the edit to the data file through the message input field of the first user interface comprises receiving the edit to the first excerpt of the data file displayed within the message input field of the first user interface.

3. The method of claim 1, further comprising:
   receiving an input through the second user interface indicating to enlarge the display of the edited data file within the region of the second user interface; and
   increasing a display size of the edited data file displayed within the region of the second user interface.

4. The method of claim 1, wherein the second excerpt is the same excerpt as the first excerpt.

5. The method of claim 1, wherein the second excerpt is a different excerpt as the first excerpt.

6. The method of claim 1, further comprising causing display of the first excerpt inline with the text in response to receiving the textual input.

7. The method of claim 1, wherein causing display of the edited data file within the region comprises causing display of a third excerpt of the edited data file that is greater than the second excerpt within the region of the second user interface.

8. The method of claim 1, wherein causing display of the edited data file within the region comprises causing display of the entirety of the edited data file within the region of the second user interface.

9. A system for providing attachments of data files in online communication sessions between a plurality of participants, the system comprising:
   one or more hardware processors;
   one or more memories, storing instructions, which when executed, cause the one or more hardware processors to perform operations comprising:
   causing display of a first user interface at a first client device of a first participant of a communication session, the first user interface comprising a message input field defined within the first user interface for receiving input to compose messages for transmission in the communication session;
   causing display of a second user interface at a second client device of a second participant of the communication session, the second user interface comprising a region defined for displaying messages within the second user interface previously transmitted by participants of the communication session;
   receiving selection of a data file at the first client device;
   causing display of at least a first excerpt of the data file editable within the message input field of the first user interface;
   receiving an edit to the data file through the message input field of the first user interface;
   incorporating the edit to the data file at a stored location of the data file;
   receiving textual input through the message input field of the first user interface causing display of text within the message input field;
   transmitting the edited data file and the text to the second client device; and
   causing display of the text and a second excerpt of the edited data file within the region defined for displaying messages of the second user interface;
   receiving selection of the second excerpt within the region; and
   causing display of the edited data file within the region in response to receiving the selection of the second excerpt, the edited data file opened to a position corresponding to the position of the second excerpt within the edited data file.

10. The system of claim 9, wherein the operation of receiving the edit to the data file through the message input field of the first user interface comprises receiving the edit to the first excerpt of the data file displayed within the message input field of the first user interface.

11. The system of claim 9, the operations further comprising:
   receiving an input through the second user interface indicating to enlarge the display of the edited data file within the region of the second user interface; and
   increasing a display size of the edited data file displayed within the region of the second user interface.

12. The system of claim 9, wherein the second excerpt is the same excerpt as the first excerpt.

13. The system of claim 9, wherein the second excerpt is a different excerpt as the first excerpt.

14. The system of claim 9, the operations further comprising causing display of the first excerpt inline with the text in response to receiving the textual input.

15. The system of claim 9, wherein the operation of causing display of the edited data file within the region comprises causing display of a third excerpt of the edited data file that is greater than the second excerpt within the region of the second user interface.

16. The system of claim 9, wherein the operation of causing display of the edited data file within the region comprises causing display of the entirety of the edited data file within the region of the second user interface.

17. A system for providing attachments of data files in online communication sessions between a plurality of participants, the system comprising:
   means for causing display of a first user interface at a first client device of a first participant of a communication session, the first user interface comprising a message input field defined within the first user interface for receiving input to compose messages for transmission in the communication session;
   means for causing display of a second user interface at a second client device of a second participant of the communication session, the second user interface comprising a region defined for displaying messages within the second user interface previously transmitted by participants of the communication session;
   means for receiving selection of a data file at the first client device;
   means for causing display of at least a first excerpt of the data file editable within the message input field of the first user interface;
   means for receiving an edit to the data file through the message input field of the first user interface;
   means for incorporating the edit to the data file at a stored location of the data file;
   means for receiving textual input through the message input field of the first user interface causing display of text within the message input field;
   means for transmitting the edited data file and the text to the second client device; and
   means for causing display of the text and a second excerpt of the edited data file within the region defined for displaying messages of the second user interface;
   means for receiving selection of the second excerpt within the region; and
   means for causing display of the edited data file within the region in response to receiving the selection of the second excerpt, the edited data file opened to a position corresponding to the position of the second excerpt within the edited data file.

18. The system of claim 17, wherein the means for receiving the edit to the data file through the message input field of the first user interface comprise means for receiving the edit to the first excerpt of the data file displayed within the message input field of the first user interface.

19. The system of claim 17, further comprising:
   means for receiving an input through the second user interface indicating to enlarge the display of the edited data file within the region of the second user interface; and
   means for increasing a display size of the edited data file displayed within the region of the second user interface.

20. The system of claim 17, further comprising means for causing display of the first excerpt inline with the text in response to receiving the textual input.

* * * * *